US011430141B2

(12) United States Patent
Tamama et al.

(10) Patent No.: US 11,430,141 B2
(45) Date of Patent: Aug. 30, 2022

(54) ARTIFICIAL REALITY SYSTEM USING A MULTISURFACE DISPLAY PROTOCOL TO COMMUNICATE SURFACE DATA

(71) Applicant: Facebook Technologies, LLC, Menlo Park, CA (US)

(72) Inventors: Hideo Tamama, Kirkland, WA (US); Alok Kumar Mathur, Cupertino, CA (US); Steve John Clohset, San Francisco, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 295 days.

(21) Appl. No.: 16/742,744

(22) Filed: Jan. 14, 2020

(65) Prior Publication Data

US 2021/0133991 A1    May 6, 2021

Related U.S. Application Data

(60) Provisional application No. 62/930,499, filed on Nov. 4, 2019.

(51) Int. Cl.
  *G06T 7/40* (2017.01)
  *G06T 15/00* (2011.01)
  (Continued)

(52) U.S. Cl.
  CPC .............. *G06T 7/40* (2013.01); *G02B 27/017* (2013.01); *G06F 9/544* (2013.01); *G06F 30/30* (2020.01);
  (Continued)

(58) Field of Classification Search
  None
  See application file for complete search history.

(56) References Cited

U.S. PATENT DOCUMENTS 7,525,547 B1   4/2009  Diard
8,634,431 B1   1/2014  Chiang et al.
(Continued)

FOREIGN PATENT DOCUMENTS

EP    0831424 A2    3/1998
EP    3418879 A1   12/2018
(Continued)

OTHER PUBLICATIONS

International Search Report and Written Opinion of International Application No. PCT/US2020/057561, dated Mar. 31, 2021, 11 pp.
(Continued)

*Primary Examiner* — Frank S Chen
(74) *Attorney, Agent, or Firm* — Shumaker & Sieffert, P.A.

(57) ABSTRACT

This disclosure describes efficient communication of surface texture data between system on a chip (SOC) integrated circuits. An example system includes a first integrated circuit, and at least one second integrated circuit communicatively coupled to the first integrated circuit by a communication interface. The first integrated circuit, upon determining that surface texture data of a frame to be rendered for display by the second SoC integrated circuit is to be updated, (a) transmits the surface texture data in one or more update packets to the second integrated circuit using the communication interface, and (b) transmits a command to the second integrated circuit indicating that the surface texture data of the frame has been updated using the communication interface. The second integrated circuit, upon receipt of the command, (a) sets a pointer to a location in the display buffer storing the surface texture data of the frame, and (b) renders the surface texture data of the frame for display on a display device.

12 Claims, 21 Drawing Sheets

(51) Int. Cl.
  *G06T 19/00* (2011.01)
  *G06F 30/30* (2020.01)
  *G06F 9/54* (2006.01)
  *G02B 27/01* (2006.01)
  *G06F 115/02* (2020.01)

(52) U.S. Cl.
  CPC .......... *G06T 15/005* (2013.01); *G06T 19/006* (2013.01); *G06F 2115/02* (2020.01)

(56) References Cited

U.S. PATENT DOCUMENTS

| | | |
|---|---|---|
| 8,848,792 B2 | 9/2014 | MacInnis et al. |
| 10,672,098 B1 | 6/2020 | Chemparathy et al. |
| 11,158,126 B1 * | 10/2021 | Petrov ................... G06T 19/003 |
| 2006/0262851 A1 | 11/2006 | Bakfan et al. |
| 2007/0121638 A1 | 5/2007 | Szczebak, Jr. et al. |
| 2007/0171234 A1 | 7/2007 | Crawfis et al. |
| 2009/0046105 A1 * | 2/2009 | Bergland ............... G06T 15/005 |
| | | 345/581 |
| 2011/0199931 A1 | 8/2011 | Anderson et al. |
| 2015/0324955 A1 * | 11/2015 | Cawley .................. H04N 1/387 |
| | | 345/649 |
| 2018/0082465 A1 * | 3/2018 | Surti .......................... G06T 1/20 |
| 2018/0324074 A1 * | 11/2018 | Korhonen ............... H04L 43/08 |
| 2019/0310818 A1 * | 10/2019 | Liu ....................... G06F 3/1415 |

FOREIGN PATENT DOCUMENTS

| | | |
|---|---|---|
| EP | 3657327 A1 | 5/2020 |
| WO | 2019015591 A1 | 1/2019 |

OTHER PUBLICATIONS

International Preliminary Report on Patentability for International Application No. PCT/US2020/057561, dated May 19, 2022, 9 pages.

* cited by examiner

| HEADER 602 | FORMAT 1002 | Value identifying the payload as a "TEXTURE DONE PAYLOAD" |
|---|---|---|
| | SIZE 1004 | Number of bytes in the payload |
| TEXTURE DONE PAYLOAD 604 | TEXTURE MANAGEMENT 1006 | Information to identify and manage texture in memory. |
| | CHANNEL CHARACTERISTICS [OPTIONAL] 1008 | Average red color value collected across the entire texture |

| HEADER 602 | FORMAT 1102 | Value identifying the payload as a "FRAME SETUP PAYLOAD" |
|---|---|---|
| | SIZE 1104 | Number of bytes in the payload |
| FRAME SETUP PAYLOAD 604 | TEXTURE MANAGEMENT 1106 | Information to identify and manage texture in memory. |
| | TIME 1108 | Time for the rendered texture |
| | SE3 1110 | Special Euclidean transformation |
| | TEXTURE INTEGRITY 1112 | Information to verify integrity of later surface updates |

| HEADER 602 | FORMAT 1202 | Value identifying the payload as a "WRITE DATA PAYLOAD" |
|---|---|---|
| | SIZE 1204 | Number of bytes in the payload |
| WRITE DATA PAYLOAD 604 | ADDRESS 1206 | Destination address in display SoC memory. |
| | DATA 1208 | Data to place in memory |

| HEADER 602 | FORMAT 1302 | Value identifying the payload as a "VSYNC PAYLOAD" |
|---|---|---|
| | SIZE 1304 | Number of bytes in the payload |
| VSYNC PAYLOAD 604 | ADDRESS 1306 | Address for the VSYNC value in the Display SoC |
| | DATA 1308 | Timer value at VSYNC point |

ARTIFICIAL REALITY SYSTEM USING A MULTISURFACE DISPLAY PROTOCOL TO COMMUNICATE SURFACE DATA

This application claims the benefit of U.S. Provisional Patent Application No. 62/930,499, filed on Nov. 4, 2019, the entire contents of which is incorporated by reference herein.

TECHNICAL FIELD

The disclosure generally relates to artificial reality systems, such as augmented reality, mixed reality, and/or virtual reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may entirely comprise content that is generated by the system or may include generated content combined with captured content (e.g., real-world video and/or images). During operation, the user typically interacts with the artificial reality system to select content, launch applications, configure the system and, in general, experience artificial reality environments.

SUMMARY

In general, the disclosure describes artificial reality (AR) systems and techniques that use a communication protocol designed for transferring video data to communicate non-video surface data to facilitate changing how surface data is processed and displayed when creating an artificial reality (AR) scene within a multi-device AR system. An example multi-device AR system includes a system in which a peripheral device operates as a co-processing AR device when paired with one or more head-mounted displays (HMDs). For example, as further described herein, the peripheral device and each HMD may each include one or more System on a Chip (SoC) integrated circuits (referred to herein as "SoCs" or "SoC integrated circuits") that are collectively configured to provide an artificial reality application execution environment.

Various examples of an artificial reality (AR) system including a head-mounted display (HMD) using a video data communication protocol to communicate raw surface (or texture) data from memory in an AR central processing System on Chip (SoC) integrated circuit to display buffers on display SoC integrated circuits in a low power mode are described below.

Conventionally, a display buffer is controlled by a main processing circuit and a display receives video data from this buffer as it is to be display. Consequently, the display needs to be constantly refreshed from the buffer because the display does not store any of the video data in memory. This requires frequent communication using the video data communication protocol in an active, high power transmission mode (sometimes referred to as "video mode").

As described below, the AR system leverages the fact that not all surfaces to be displayed are updated in every video frame. Some surface textures to be displayed are animated and change frequently. For example, a surface texture associated with a player avatar may have animation that changes with every video frame. However, some surface textures to be display are static and do not change frequently. For example, a surface texture associated with a poster or other decoration may not change during an AR scene. The disclosure leverages this in two ways.

First, the display buffer is located within the display SoC integrated circuit instead of the AR central processing SoC integrated circuit. This display buffer is a duel buffer. The various surface textures for the current AR scene are stored in specific locations within the display buffer. A texture pointer associated with a surface points to either the location in memory associated with that texture in the first buffer or the location in memory associated with that texture in the second buffer. The location in memory that is not being pointed to can be updated. The texture pointer switches after a texture update so that the updated texture will appear in the next video frame.

Second, the AR central processing SoC integrated circuit does not send an update for a particular surface texture to the display SoC integrated circuit unless that surface texture is to be updated in the next video frame. Because of this reduction in data to be transmitted, the AR central processing SoC integrated circuit uses a transmission mode that can be set to idle between transmissions (sometimes referred to as a "command mode") to save power. In the command mode, the payload of the video data communication interface is relatively small. To overcome this challenge, the AR central processing SoC integrated circuit breaks the surface texture to be transmitted into packets and sends these smaller packets to the display SoC integrated circuits. The display SoC integrated circuits reassemble the packets into the surface texture, places the surface texture into the appropriate location in the display buffer, and switches the associated texture pointer.

The AR central processing SoC integrated circuit transmits a setup frame that defines the parameters of the surfaces in the AR scene. The surfaces are subsequently updated based on these parameters. Additionally, the AR central processing SoC integrated circuit maintains a master VSYNC timer. At the start of each new frame, the AR central processing SoC integrated circuit sends a VSYNC update command to each display SoC integrated circuit. The display SoC integrated circuits use the VSYNC update command to adjust their internal VSYNC timer. The AR central processing SoC integrated circuit then sends the packets that contain the texture data for the surface to be updated. The AR central processing SoC integrated circuit sends a DONE command after the last packet of a texture for a frame. Each display SoC integrated circuit updates its base texture pointer for that surface on the next frame (stored in the secondary buffer) after receiving the DONE command.

Because the display buffer is controlled by the display SoC integrated circuit, less texture data needs to be communicated from the AR central processing SoC integrated circuit. As a result, less power will be used to display the video frames An example artificial reality system includes a first integrated circuit and at least one second integrated circuit communicatively coupled to the first integrated circuit by a communication interface. The first integrated circuit includes at least one processor configured to, upon determining that surface texture data of a frame to be rendered for display by the second SoC integrated circuit is to be updated, send the surface texture data in one or more update packets to the second integrated circuit using the communication interface; and send a command to the second integrated circuit indicating that the surface texture data of the frame has been updated using the communication interface. The second integrated circuit includes at least one display buffer and at least one processor configured to upon receipt of the command, set a pointer to a location in the display buffer storing the surface texture data of the frame, and render the surface texture data of the frame for display on a display device.

An example method for rendering an artificial reality scene includes determining, by a first integrated circuit, whether one of a plurality of surface textures to be rendered for display is to be updated. The method also includes, upon determining that the one of a plurality of surface textures is to be updated, sending a corresponding surface texture data in one or more update packets to a second integrated circuit using a communication interface using a low power mode, and sending a command to the second integrated circuit indicating that the corresponding surface texture data of the frame has been updated using the communication interface. Additionally, the method includes, upon receipt of the command, setting, by the second integrated circuit, a pointer to a predetermined location in a display buffer for storing the surface texture data of the updated surface texture, and rendering, by a display driven by the second integrated circuit, the surface texture data of the frame for display on a display device.

The details of one or more examples are set forth in the accompanying drawings and the description below. Other features, objects, and advantages will be apparent from the description and drawings, and from the claims.

1B is an illustration depicting another example multi-device AR system operating in accordance with techniques described in this disclosure.

Figure 2A:
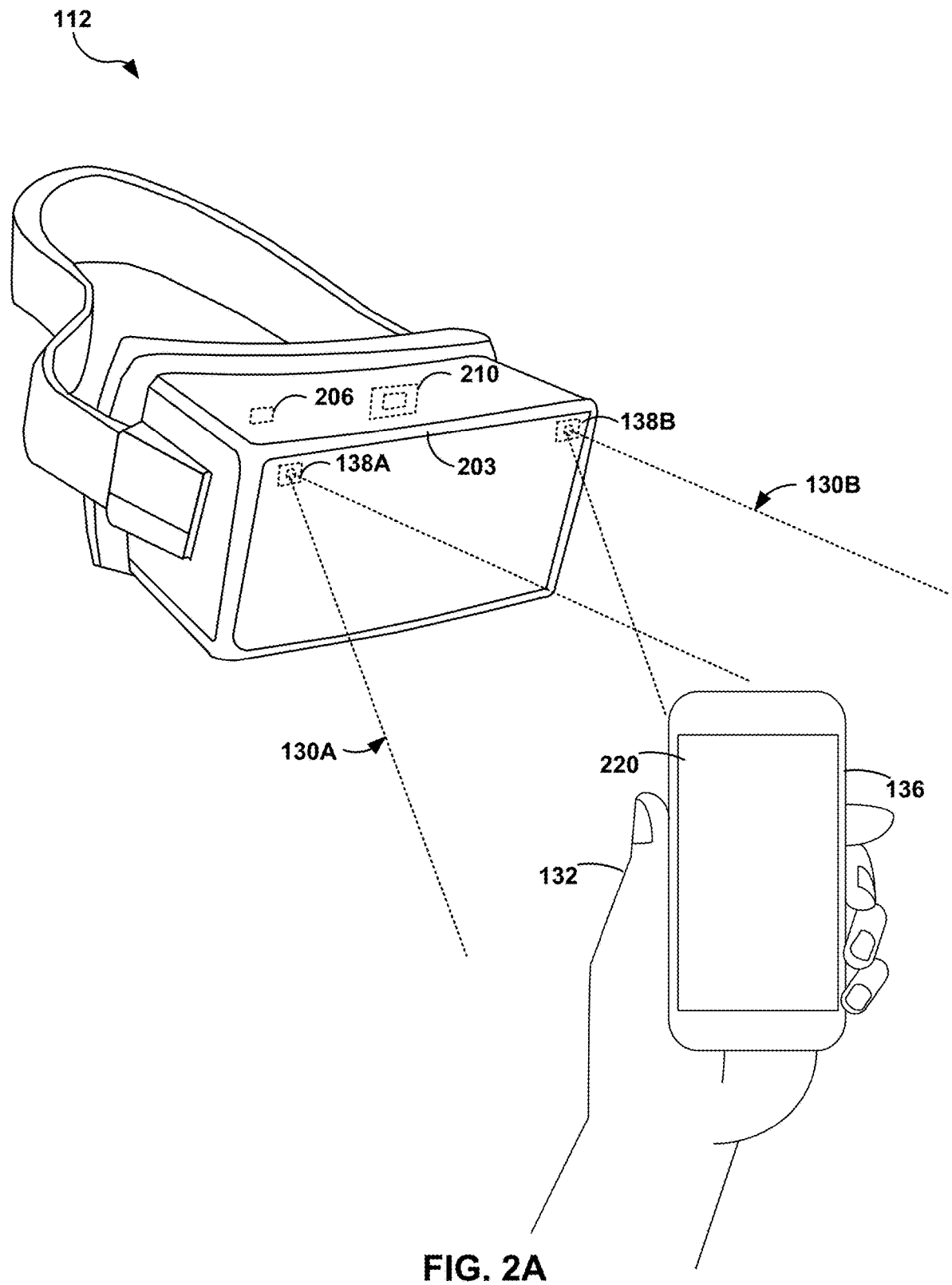

FIG. 2A is an illustration depicting an example head mounted display (HMD) and an example peripheral device operating in accordance with techniques described in this disclosure.

Figure 2B:
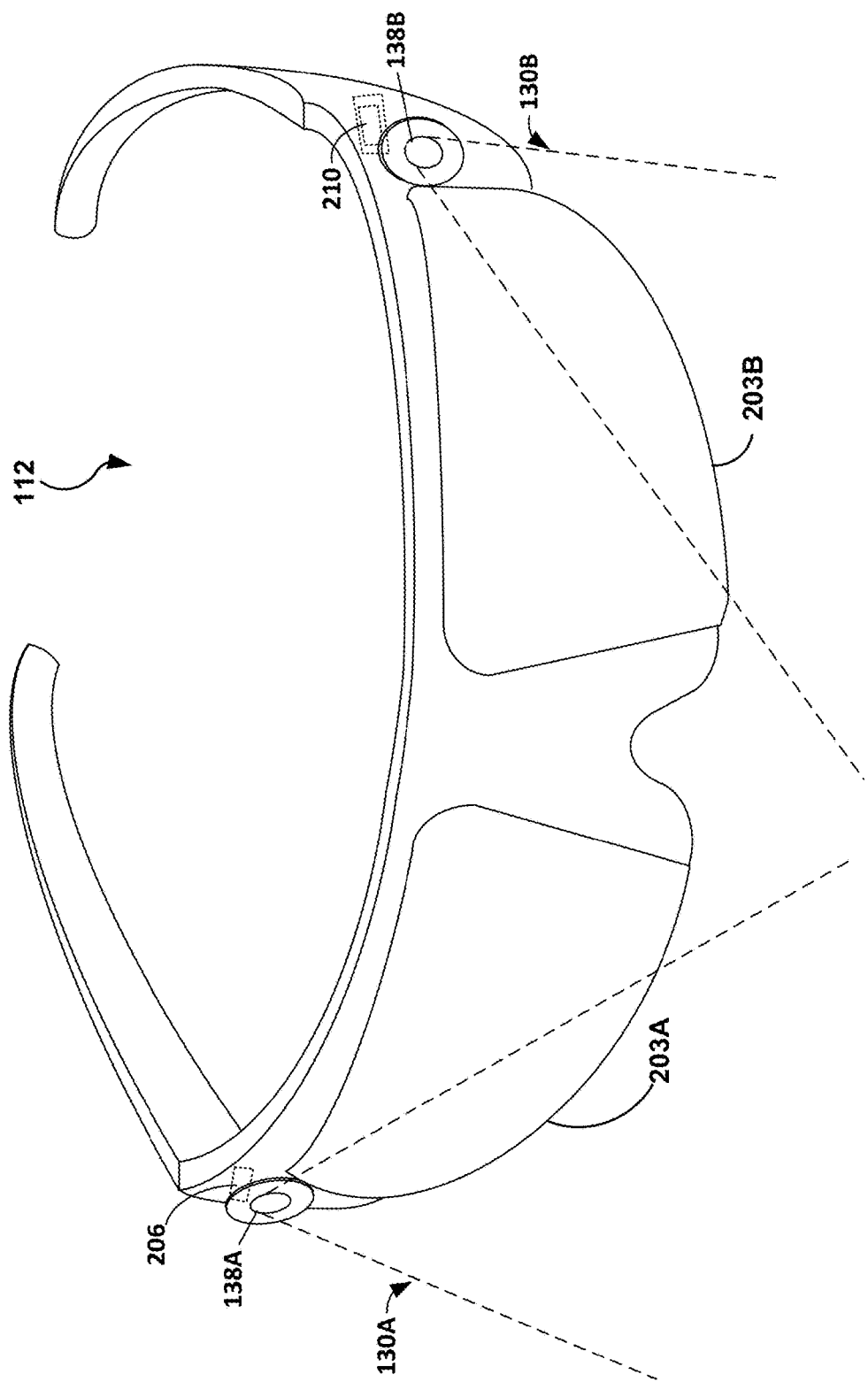

FIG. 2B is an illustration depicting another example HMD operating in accordance with techniques described in this disclosure.

Figure 1A:
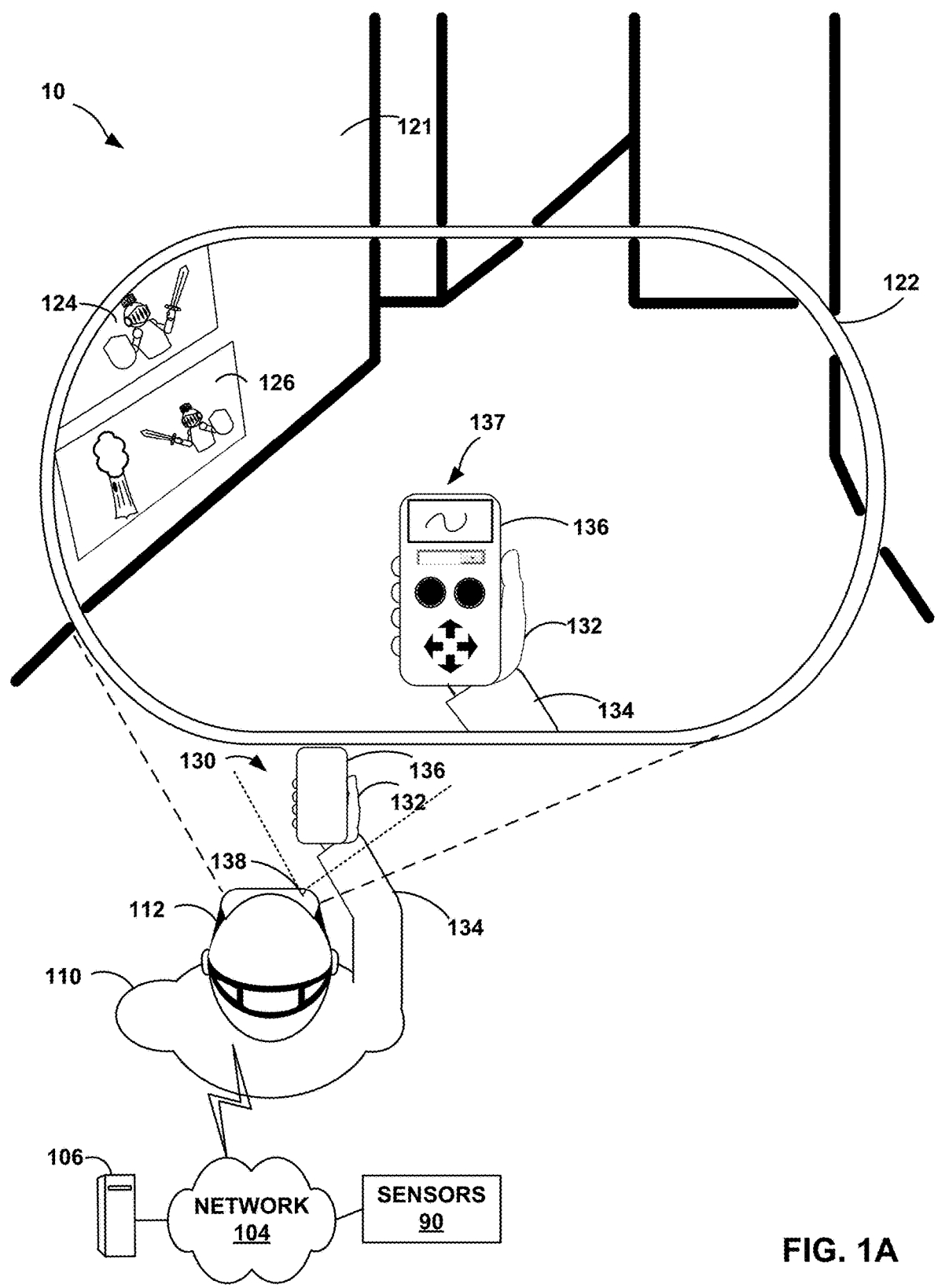
FIG. 1A is an illustration depicting an example multi-device artificial reality (AR) system operating in accordance with the techniques described in this disclosure.
Figure 1B:
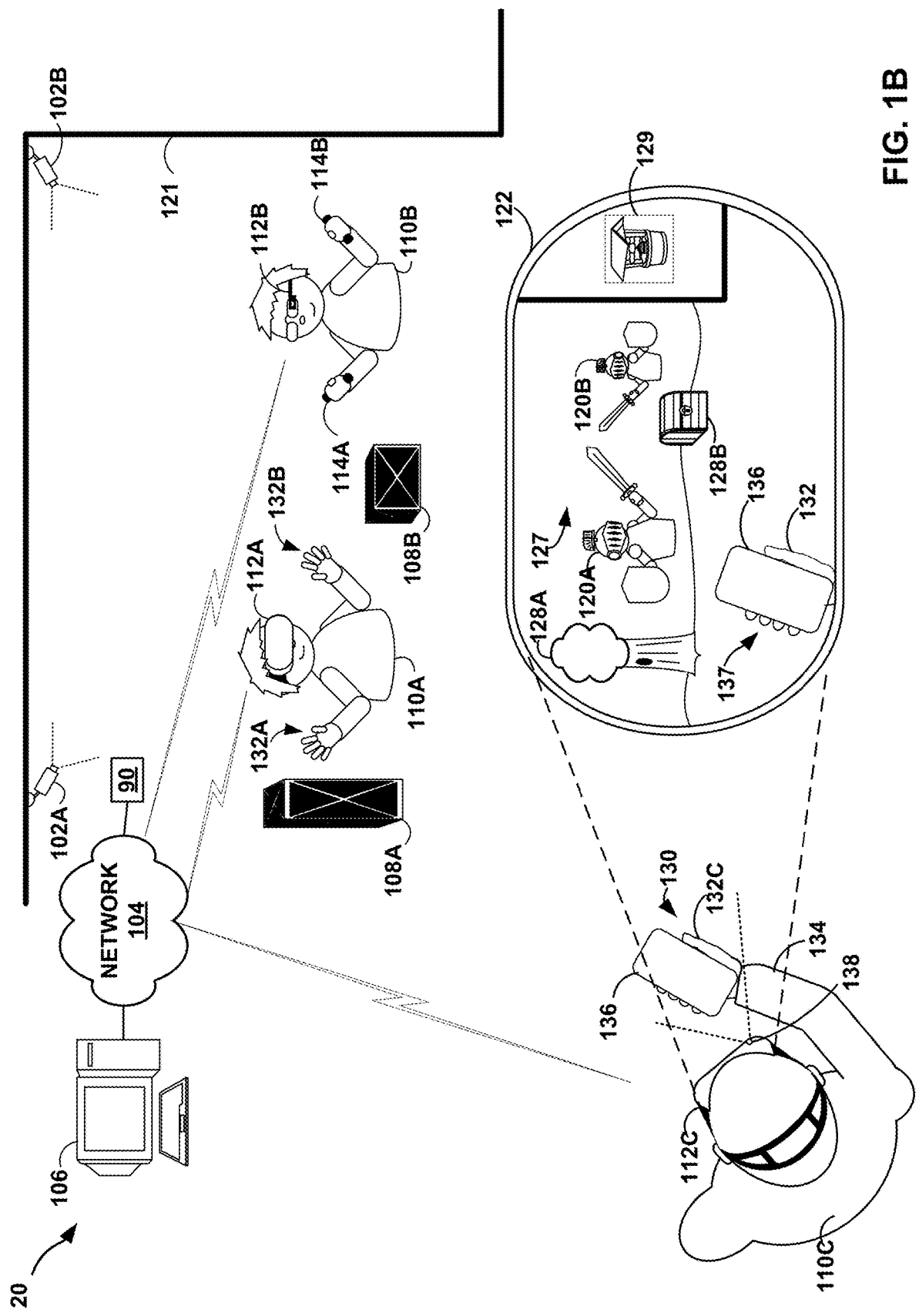
Figure 3:
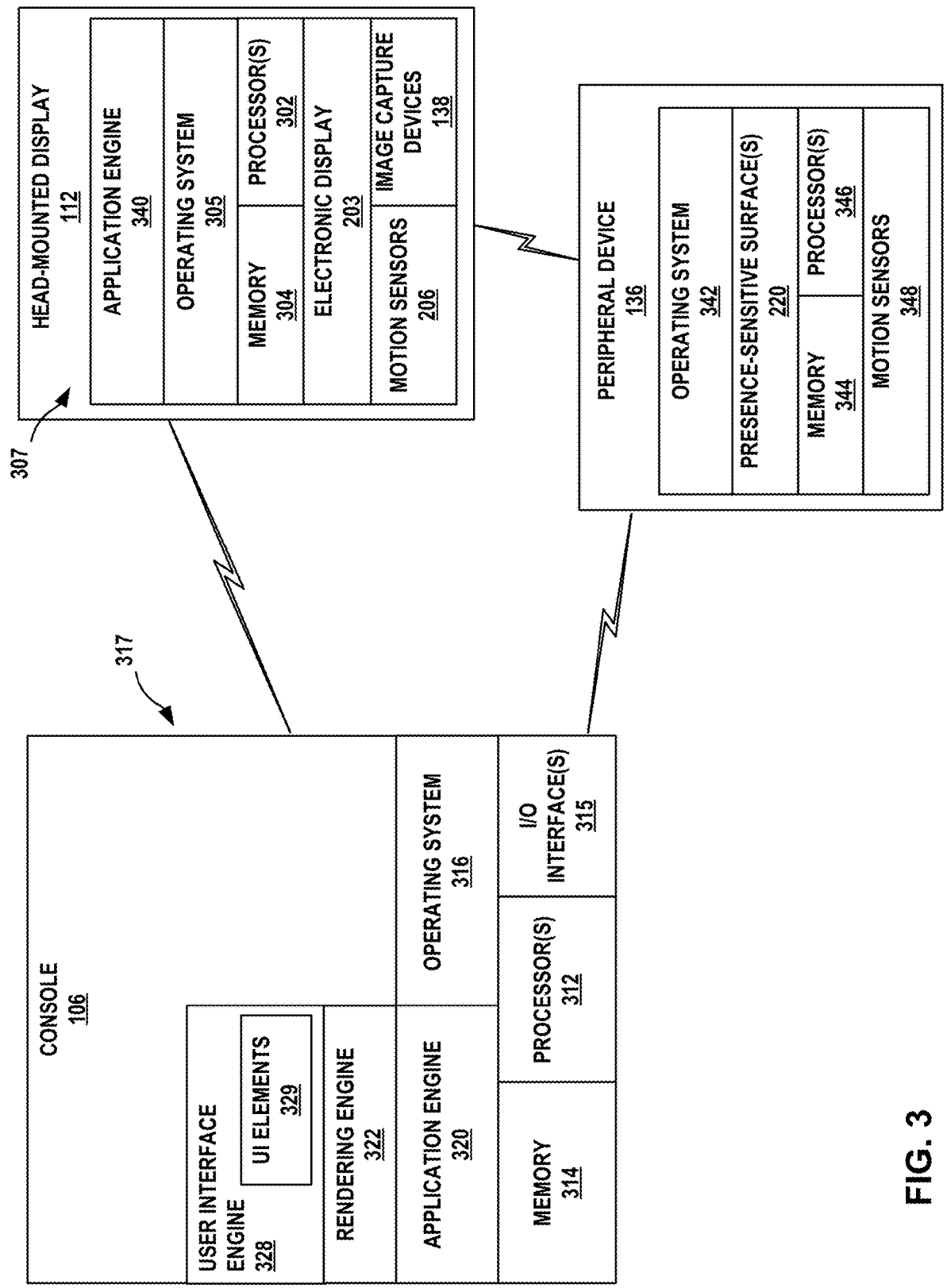

FIG. 3 is a block diagram showing example implementations of a console, an HMD, and a peripheral device of the multi-device artificial reality systems of FIGS. 1A and 1B operating in accordance with techniques described in this disclosure.

Figure 4:
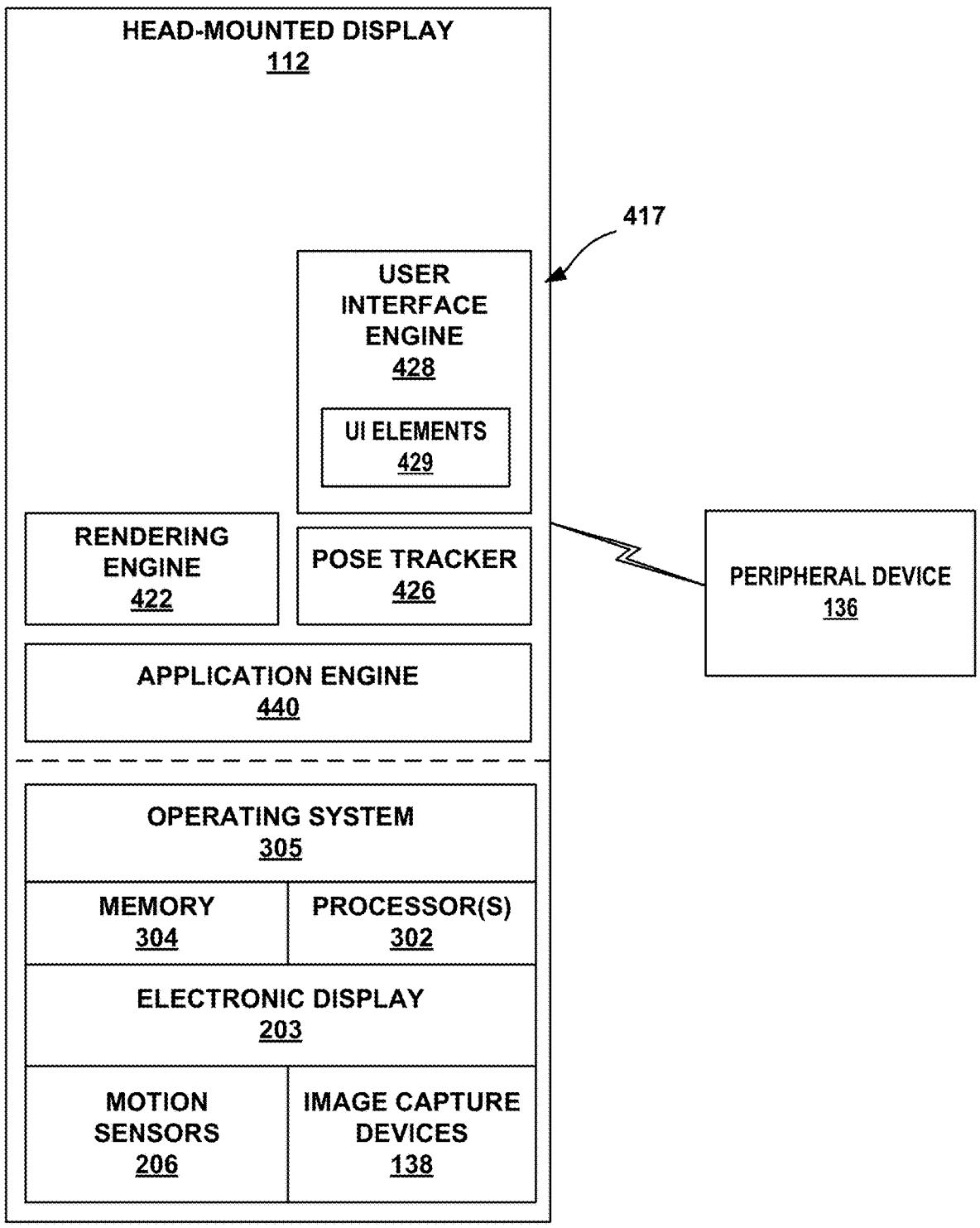

FIG. 4 is a block diagram depicting example implementations of an HMD and a peripheral device of the multi-device artificial reality systems of FIGS. 1A and 1B operating in accordance with the techniques described in this disclosure.

Figure 5:
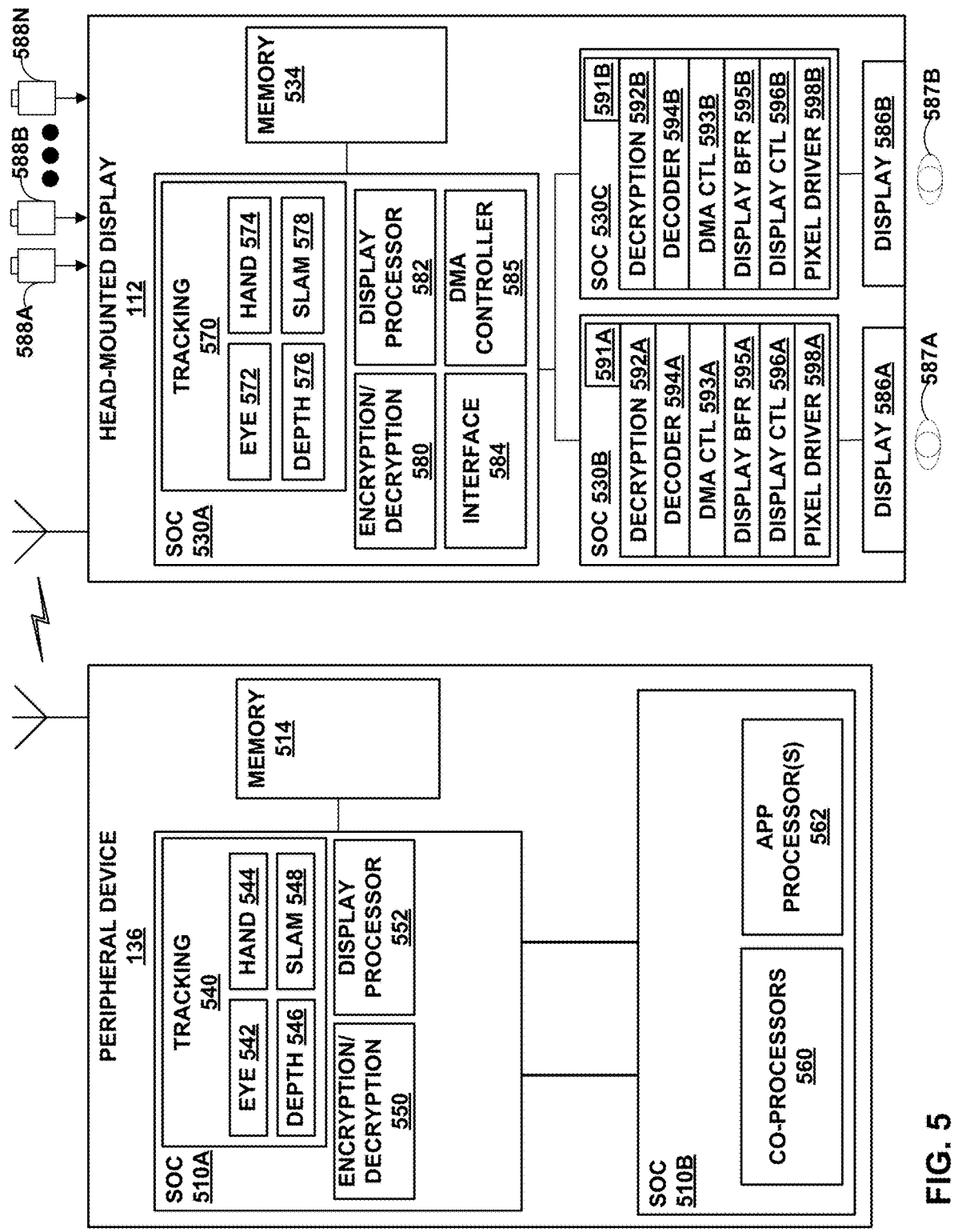

FIG. 5 is a block diagram illustrating a more detailed example implementation of a distributed architecture for a multi-device artificial reality system in which one or more devices (e.g., peripheral device and HMD) are implemented using one or more System on a Chip (SoC) integrated circuits within each device, in accordance with the techniques described in this disclosure.

Figure 6:
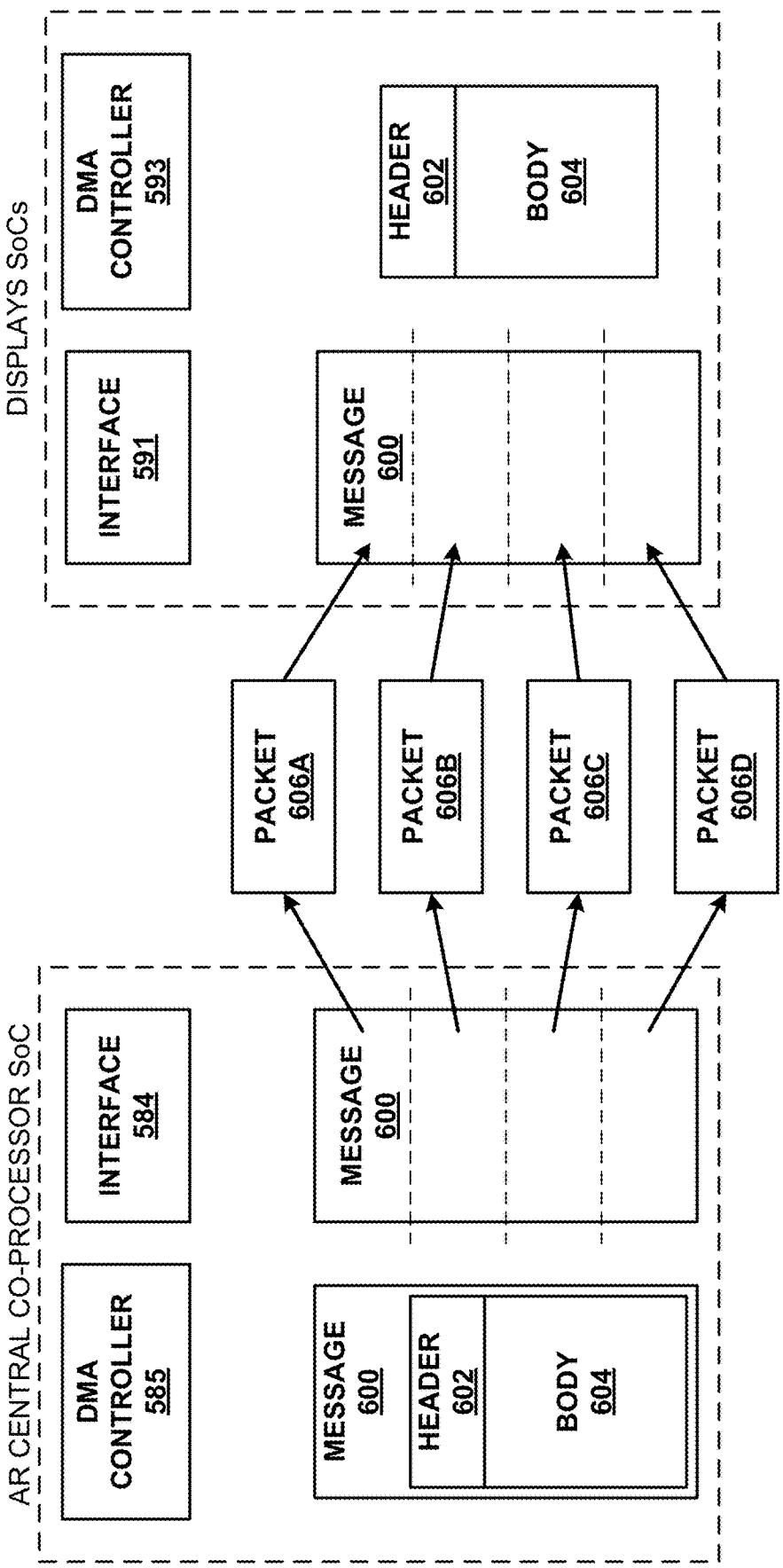

FIG. 6 is an example block diagram of an example communication pipeline of the HMD.

Figure 7:
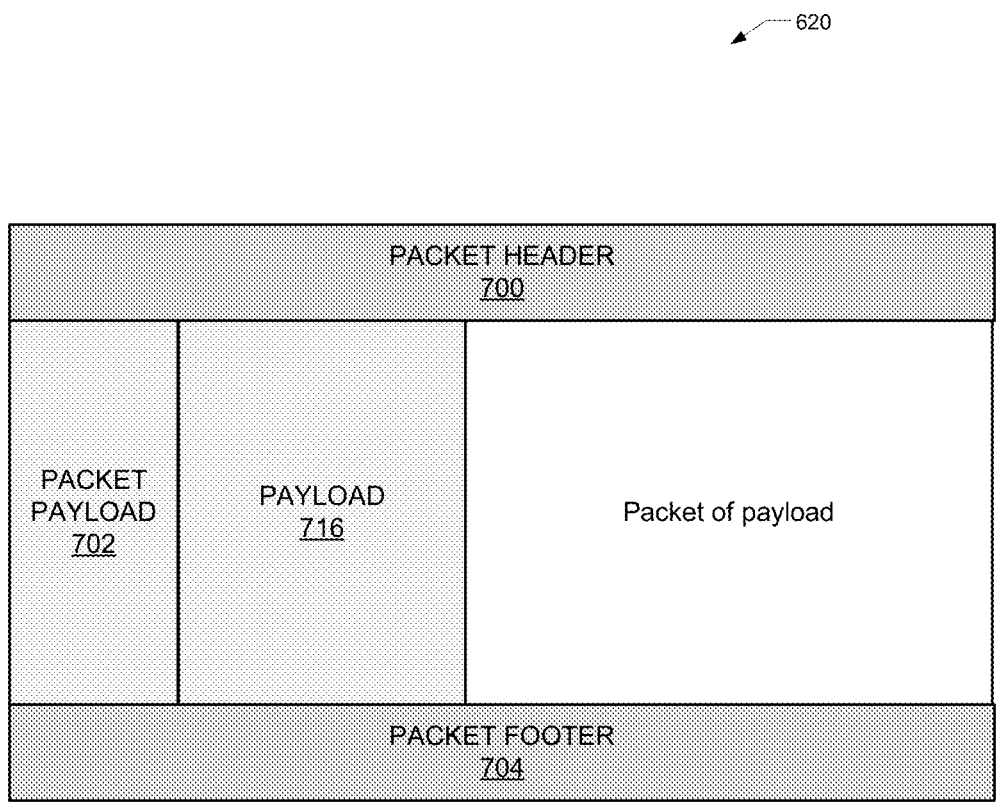

FIG. 7 illustrates a structure of the packetized message that is generated as part of the communication pipeline of FIG. 6.

Figure 8:
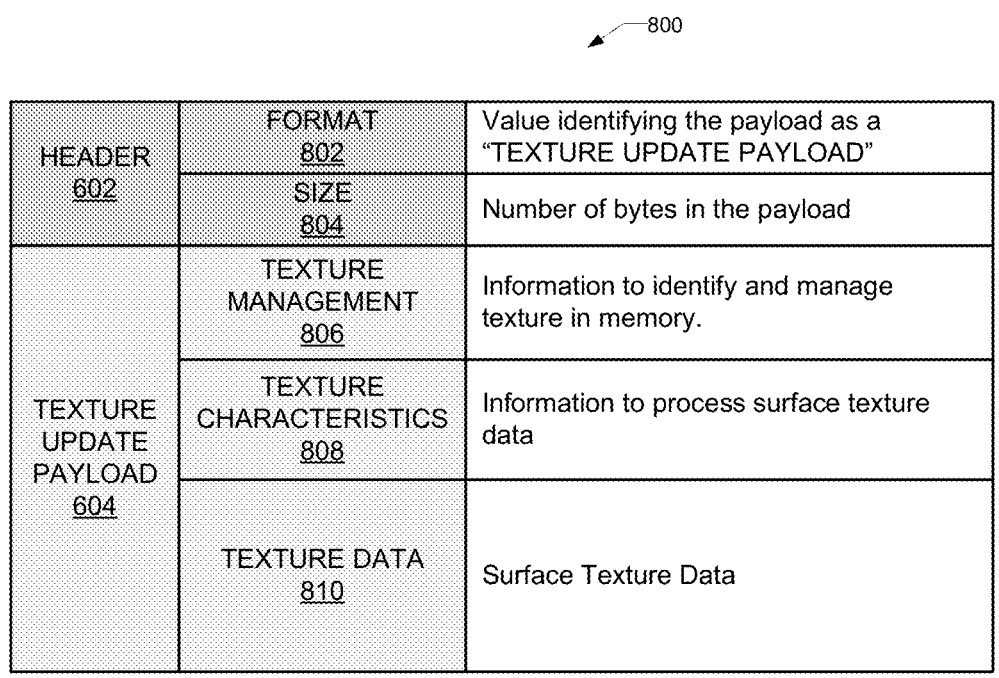

FIG. 8 illustrates a structure of a texture update packet that is generated to update a surface texture displayed by the HMD, which may be communicated via the communication pipeline of FIG. 6.

Figure 9:
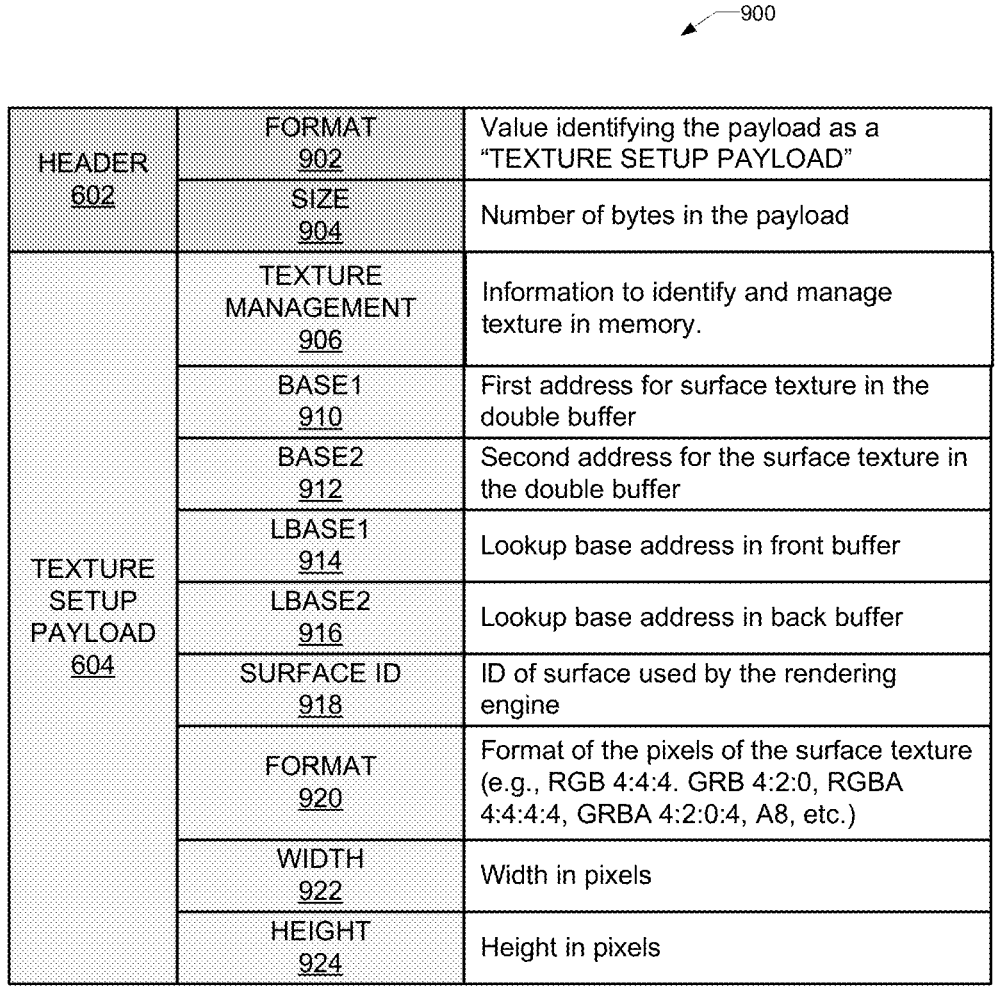

FIG. 9 illustrates an example surface setup packet that is generated to provide parameters of a surface texture, which may be communicated via the communication pipeline of FIG. 6.

FIG. 10 illustrates a structure of a command signifying that the last packet of a packetized texture surface has been transmitted, which may be communicated via the communication pipeline of FIG. 6.

FIG. 11 illustrates a structure of a frame setup packet to define a frame of a surface texture, which may be communicated via the communication pipeline of FIG. 6.

FIG. 12 illustrates a structure of a write packet to write to memory or control registers of the displays within the HMD, which may be communicated via the communication pipeline of FIG. 6.

FIG. 13 illustrates a structure of a VSYNC packet to synchronizes the video frames within the HMD, which may be communicated via the communication pipeline of FIG. 6.

Figure 14:
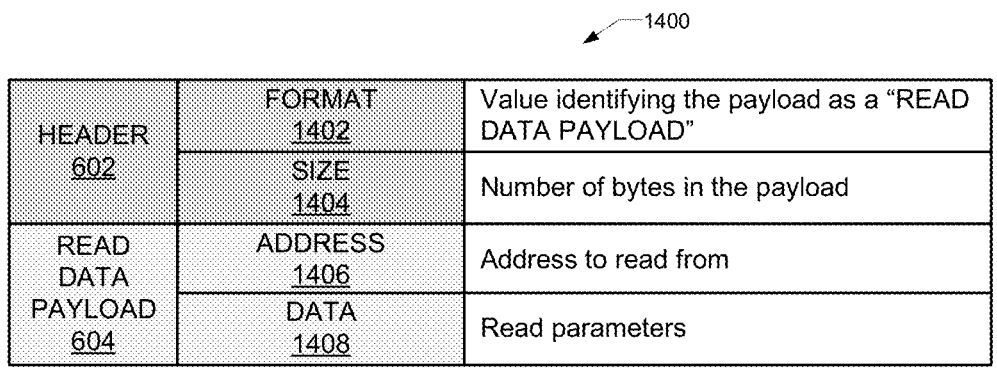

FIG. 14 illustrates a structure of a READ packet 1400, which may be communicated via the communication pipeline of FIG. 6.

Figure 15:
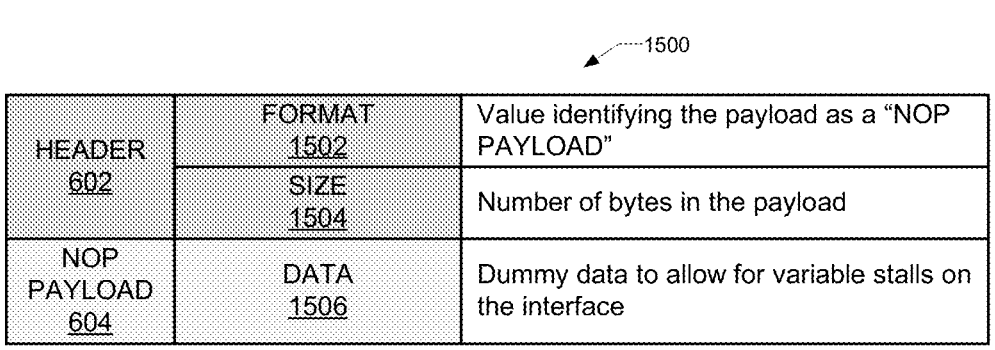

FIG. 15 illustrates a structure of a no operation packet, which may be communicated via the communication pipeline of FIG. 6.

Figure 16A:
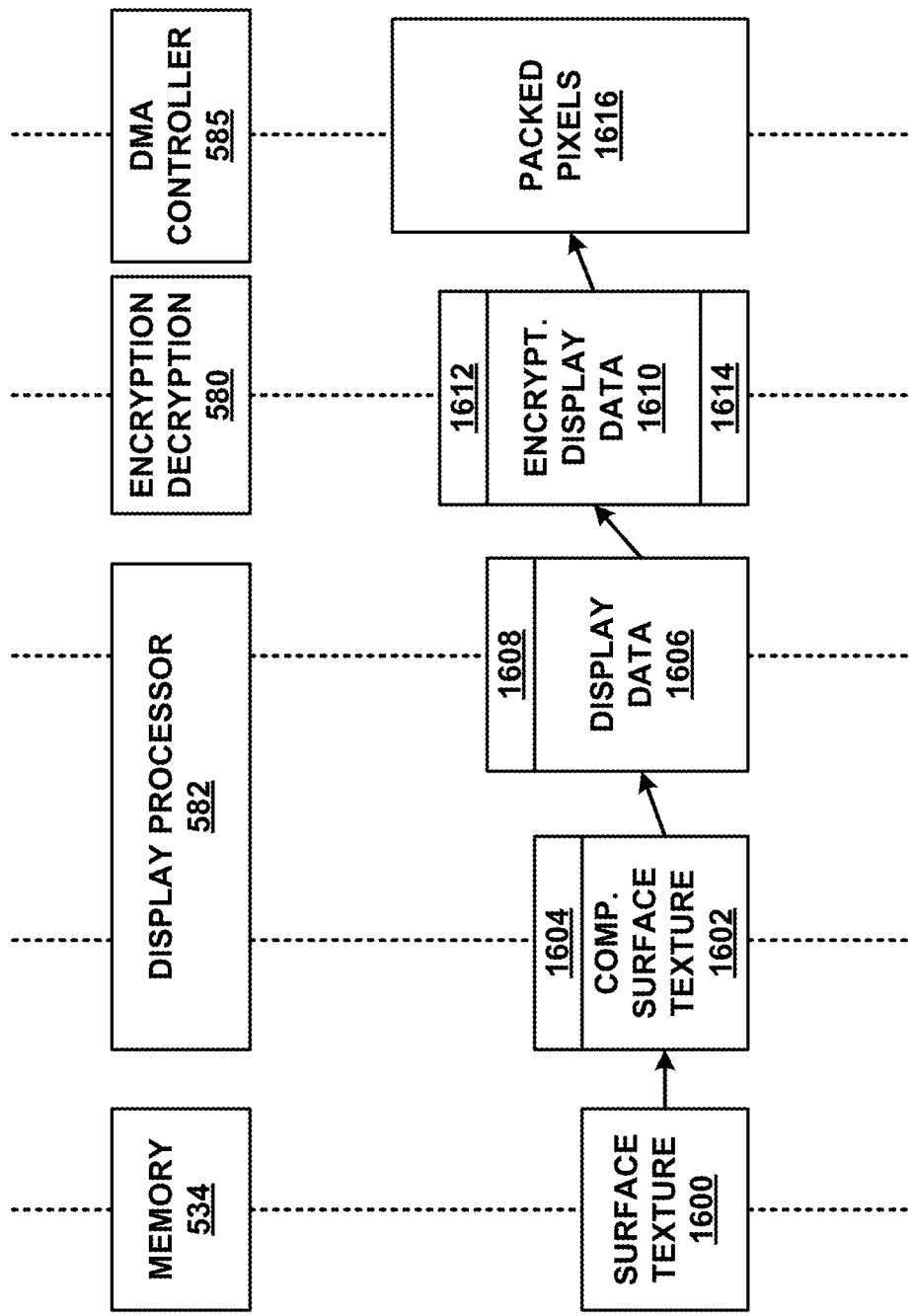
Figure 16B:
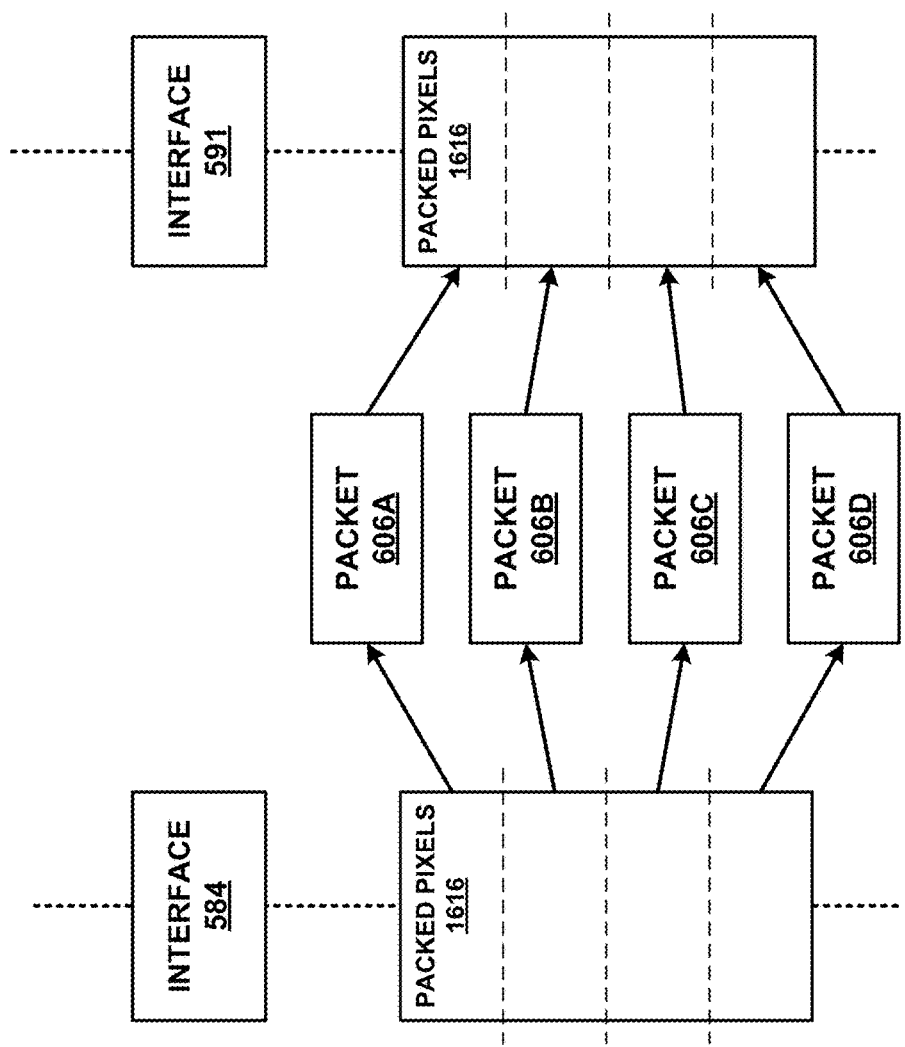
Figure 16C:
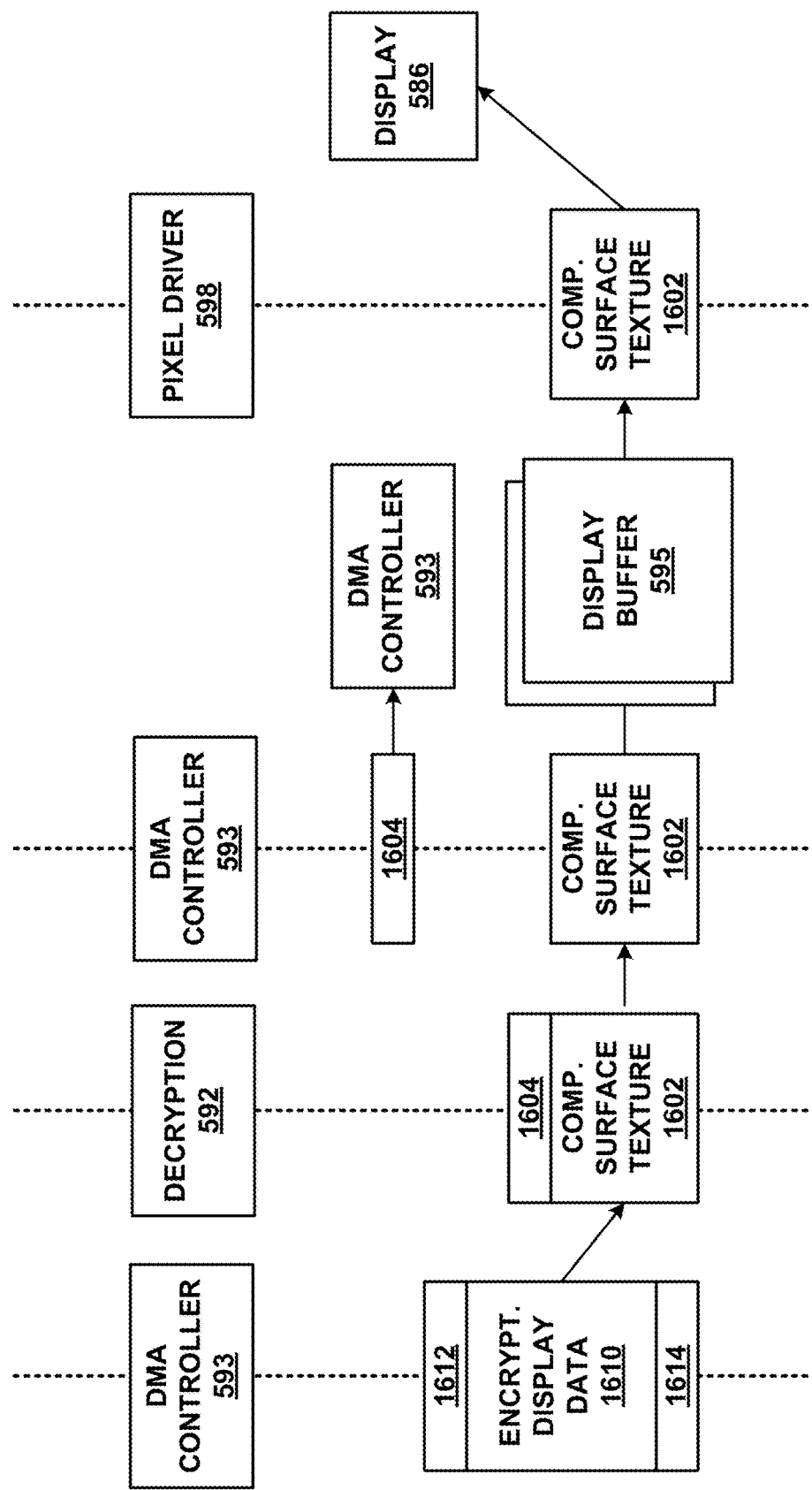

FIGS. 16A, 16B, and 16C are block diagrams of a graphics pipeline between a central processing SoC and a display SoC that incorporates the communication pipeline of FIG. 6.

Figure 17:
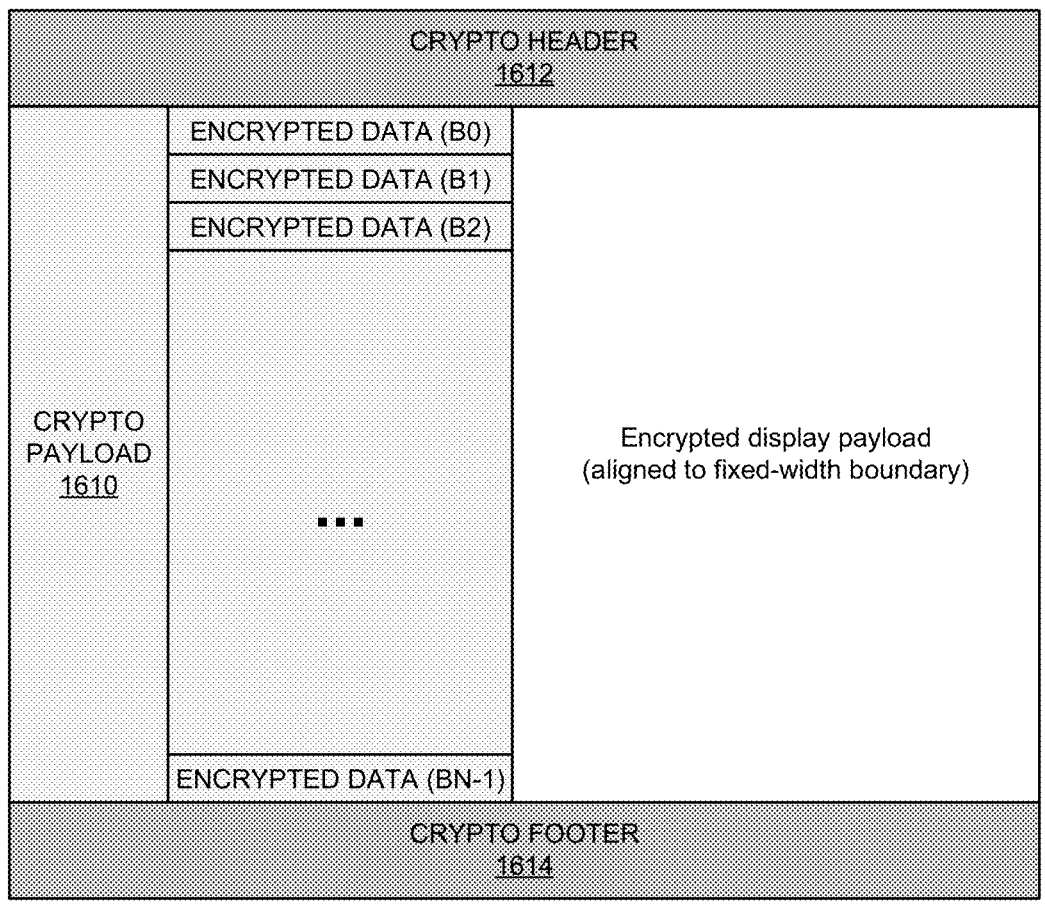

FIG. 17 illustrates an example encrypted message, which may be used by the graphics pipeline of FIGS. 16A, 16B, and 16C.

Figure 18:
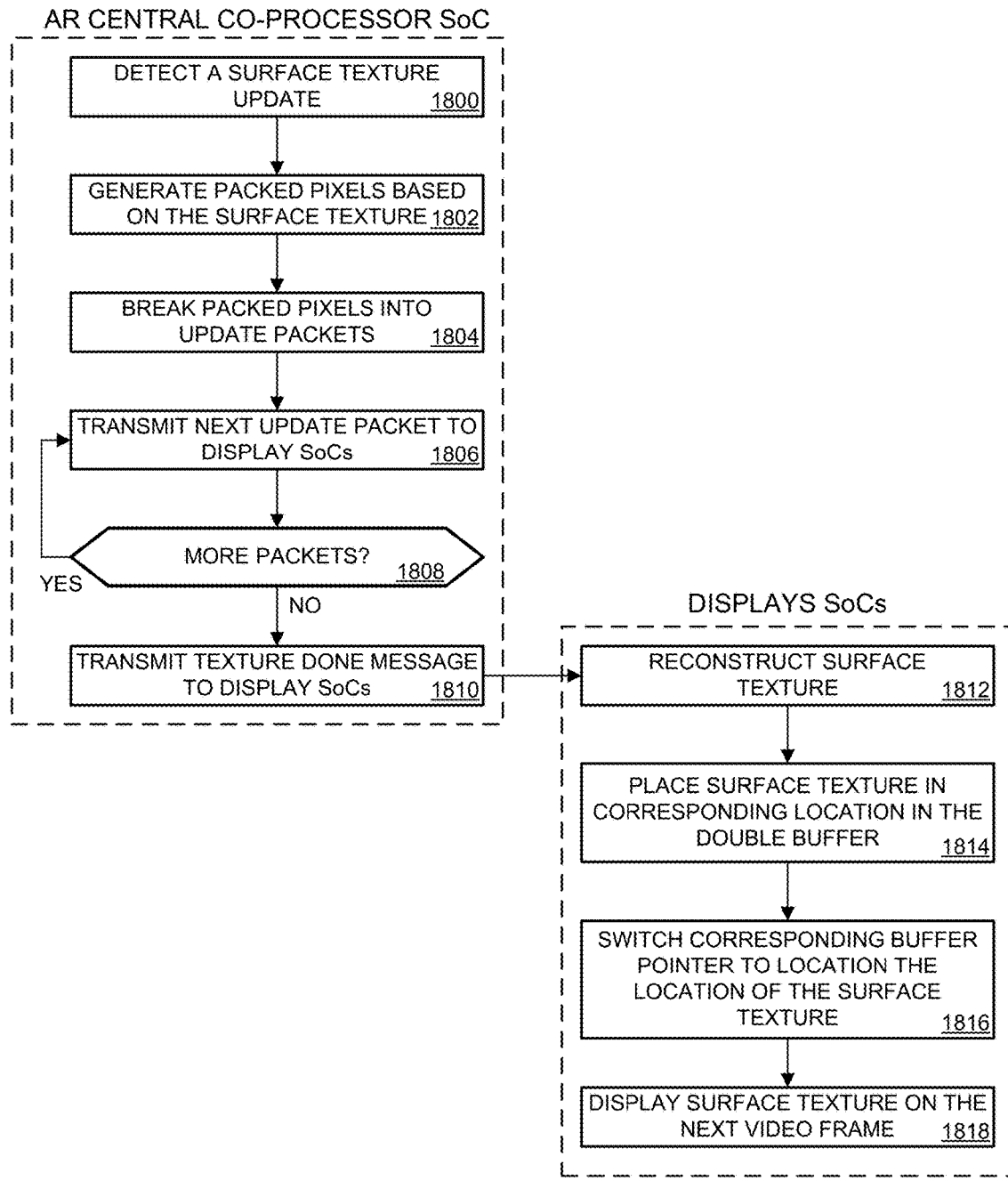

FIG. 18 is a flowchart of an example method to communicate surface texture display data to a display device that includes a double buffer.

Figure 19:
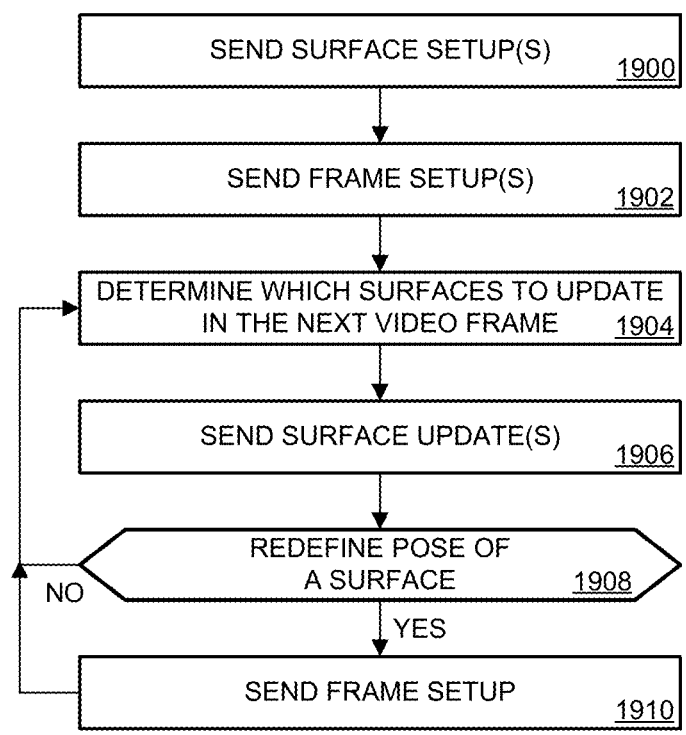

FIG. 19 is a flowchart of an example method to manage dynamic surface textures.

Figure 20:
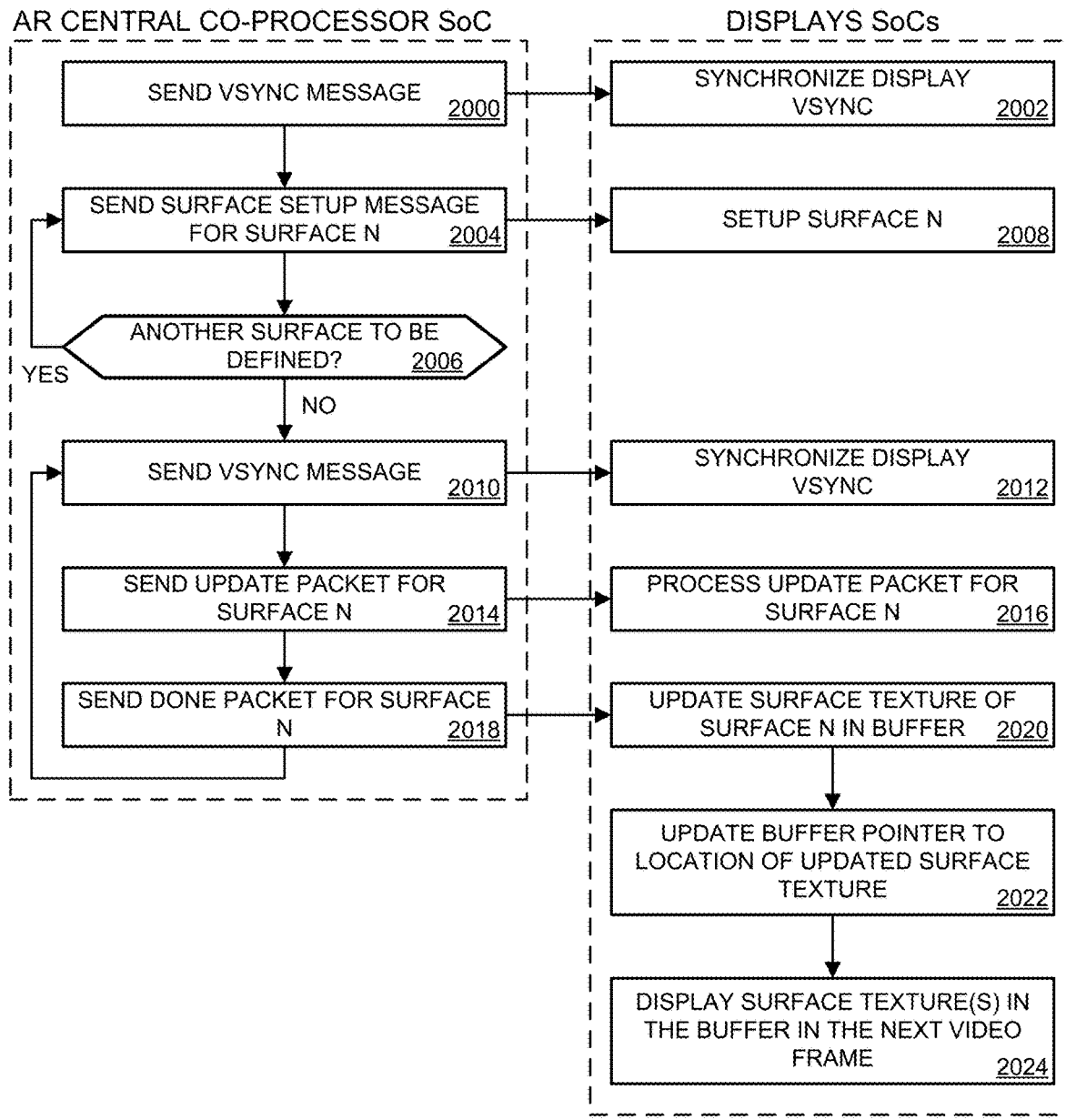

FIG. 20 is a flowchart of an example method to update and display surface textures.

DETAILED DESCRIPTION

FIG. 1A is an illustration depicting an example multi-device artificial reality system that generates artificial reality (AR) scenes in accordance with the techniques described in this disclosure. In the example of FIG. 1A, artificial reality system 10 includes head mounted display (HMD) 112, peripheral device 136, and may in some examples include one or more external sensors 90 and/or console 106.

As shown, HMD 112 is typically worn by user 110 and comprises an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, a user 110 views the artificial reality content 122 constructed and rendered by an artificial reality application executing on HMD 112 and/or console 106. In some examples, artificial reality content 122 may comprise a mixture of real-world imagery (e.g., hand 132, peripheral device 136, walls 121) and virtual objects (e.g., virtual content items 124, 126 and virtual user interface 137) displayed on actual and/or defined surfaces to produce mixed reality and/or augmented reality. In some examples, virtual content items 124, 126 may be mapped (e.g., pinned, locked, placed) to a particular position within artificial reality content 122. A position for a virtual content item may be fixed, as relative to one of wall 121 or the earth, for instance. A position for a virtual content item may be variable, as relative to peripheral device 136 or a user, for instance. In some examples, the particular position of a virtual content item within artificial reality content 122 is associated with a position within the real-world, physical environment (e.g., on the surface of a physical object or on a surface defined in relation to a physical object).

In this example, peripheral device 136 is a physical, real-world device having a surface on which AR system 10 overlays virtual user interface 137. Peripheral device 136 may include one or more presence-sensitive surfaces for detecting user inputs by detecting a presence of one or more objects (e.g., fingers, stylus) touching or hovering over locations of the presence-sensitive surface. In some examples, peripheral device 136 may include an output display, which may be a presence-sensitive display. In some examples, peripheral device 136 may be a smartphone, tablet computer, personal data assistant (PDA), or other hand-held device. In some examples, peripheral device 136 may be a smartwatch, smart ring, or other wearable device. Peripheral device 136 may also be part of a kiosk or other stationary or mobile system. Peripheral device 136 may or may not include a display device for outputting content to a screen.

In the example artificial reality experience shown in FIG. 1A, virtual content items 124, 126 are mapped to positions on wall 121. The example in FIG. 1A also shows that virtual content item 124 partially appears on wall 121 only within artificial reality content 122, illustrating that this virtual content does not exist in the real world, physical environment. Virtual user interface 137 is mapped to a surface of peripheral device 136. As a result, AR system 10 renders, at a user interface position that is locked relative to a position of peripheral device 136 in the artificial reality environment, virtual user interface 137 for display at HMD 112 as part of artificial reality content 122. FIG. 1A shows that virtual user interface 137 appears on peripheral device 136 only within artificial reality content 122, illustrating that this virtual content does not exist in the real-world, physical environment.

The artificial reality system 10 may render one or more virtual content items in response to a determination that at least a portion of the location of virtual content items is in the field of view 130 of user 110. For example, artificial reality system 10 may render a virtual user interface 137 on peripheral device 136 only if peripheral device 136 is within field of view 130 of user 110.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 10 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. As illustrated in FIG. 1A, the artificial reality application may render images of real-world objects, such as the portions of peripheral device 136, hand 132, and/or arm 134 of user 110, that are within field of view 130 along the virtual objects, such as within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application may not render representations of the hand 132 or arm 134 of the user.

During operation, artificial reality system 10 performs object recognition within image data captured by image capture devices 138 of HMD 112 to identify peripheral device 136, hand 132, including optionally identifying individual fingers or the thumb, and/or all or portions of arm 134 of user 110. Further, artificial reality system 10 tracks the position, orientation, and configuration of peripheral device 136, hand 132 (optionally including particular digits of the hand), and/or portions of arm 134 over a sliding window of time. In some examples, peripheral device 136 includes one or more sensors (e.g., accelerometers) for tracking motion or orientation of the peripheral device 136.

As described above, multiple devices of artificial reality system 10 may work in conjunction in the AR environment, where each device may be a separate physical electronic device and/or separate integrated circuits (e.g., System on a Chip (SOC)) within one or more physical devices. In this example, peripheral device 136 is operationally paired with HMD 112 to jointly operate within AR system 10 to provide an artificial reality experience. For example, peripheral device 136 and HMD 112 may communicate with each other as co-processing devices.

In accordance with the techniques of this disclosure, artificial reality system 10 may provide efficient transfer of raw surface data used to generate the AR content between different SoCs within the HMD 112. Additionally, the artificial reality system 10 provides for a double buffer to be controlled by a display driver within the display device to reduce the surface texture data to be transmitted to the display device for the video frame updates. These methods facilitate a longer battery life by reducing the time that data communication interfaces are active.

FIG. 1B is an illustration depicting another example artificial reality system 20 operating in accordance with the techniques described in this disclosure. Similar to artificial reality system 10 of FIG. 1A, in some examples, artificial reality system 20 of FIG. 1B may generate and render virtual content items with respect to a virtual surface within a multi-user artificial reality environment. The virtual surfaces may correspond to actual surfaces (e.g., planes define at least partially to wall or tables, etc.) or to defined surfaces (e.g., planes defined in space anchored to a particular set of coordinates, etc.). The artificial reality system 20 renders the virtual content items using surface textures that are rendered to appear to the users to be affixed to or incorporated into the virtual surface. Artificial reality system 20 may also, in various examples, generate and render certain virtual content items and/or graphical user interface elements to a user in response to detection of one or more particular interactions with peripheral device 136 by the user. For example, the peripheral device 136 may act as a stage device for the user to "stage" or otherwise interact with a virtual surface.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128B (collectively, "virtual objects 128") as spatially overlaid upon real world objects 108A-108B (collectively, "real world objects 108"). Further, from the perspective of HMD 112C, artificial reality system 20 renders avatars 120A, 120B based upon the estimated positions for users 110A, 110B, respectively.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may operate substantially similar to HMD 112 of FIG. 1A by tracking hand 132 and/or arm 134 of user 110C and rendering the portions of hand 132 that are within field of view 130 as virtual hand 132 within artificial reality content 122. HMD 112B may receive user inputs from controllers 114 held by user 110B. In some examples, controller 114A and/or 114B can correspond to peripheral device 136 of FIG. 1A and operate substantially similar to peripheral device 136 of FIG. 1A. HMD 112A may also operate substantially similar to HMD 112 of FIG. 1A and receive user inputs in the form of gestures performed on or with peripheral device 136 by of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using other types of communication links.

In a manner similar to the examples discussed above with respect to FIG. 1A, console 106 and/or HMD 112C of artificial reality system 20 generates and renders a virtual surface comprising virtual content item 129 (e.g., GIF, photo, application, live-stream, video, text, web-browser, drawing, animation, 3D model, representation of data files (including two-dimensional and three-dimensional datasets), or any other visible media), which may be overlaid upon the artificial reality content 122 displayed to user 110C when the portion of a surface defined in relation to wall 121 associated with virtual content item 129 comes within field of view 130 of HMD 112C. As shown in FIG. 1B, in addition to or alternatively to image data captured via camera 138 of HMD 112C, input data from external cameras 102 may be used to track and detect particular motions, configurations, positions, and/or orientations of peripheral device 136 and/or hands and arms of users 110, such as hand 132 of user 110C, including movements of individual and/or combinations of digits (fingers, thumb) of the hand.

In some aspects, the artificial reality application can run on console 106, and can utilize image capture devices 102A and 102B to analyze configurations, positions, and/or orientations of hand 132B to identify input gestures that may be performed by a user of HMD 112A. Similarly, HMD 112C can utilize image capture device 138 to analyze configurations, positions, and/or orientations of peripheral device 136 and hand 132C to input gestures that may be performed by a user of HMD 112C. In some examples, peripheral device 136 includes one or more sensors (e.g., accelerometers) for tracking motion or orientation of the peripheral device 136. The artificial reality application may render virtual content items and/or UI elements, responsive to such gestures, motions, and orientations, in a manner similar to that described above with respect to FIG. 1A.

Image capture devices 102 and 138 may capture images in the visible light spectrum, the infrared spectrum, or other spectrum. Image processing described herein for identifying objects, object poses, and gestures, for example, may include processing infrared images, visible light spectrum images, and so forth.

Devices of artificial reality system 20 may work in conjunction in the AR environment. For example, peripheral device 136 is paired with HMD 112C to jointly operate within AR system 20. Similarly, controllers 114 are paired with HMD 112B to jointly operate within AR system 20. Peripheral device 136, HMDs 112, and controllers 114 may each include one or more SoC integrated circuits (e.g., the SoC integrated circuits 510A and 510B of FIG. 5 below) configured to enable an operating environment for artificial reality applications.

The HMD 112 implements a graphics pipeline that preforms intra-device processing of surface texture data received from, for example, the peripheral device 136 and/or the console 106. To communicate between components of the HMD 112, the graphics pipeline divides surface textures and other graphics management commands into packets to transmit to a display buffer controlled by a double buffer within the display devices of the HMD 112. This enables a reduction of the amount of the surface texture data that is transmitted to the display device for the video frame updates.

FIG. 2A is an illustration depicting an example HMD 112 and an example peripheral device 136 operating in accordance with techniques described in this disclosure. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including peripheral device 136 and/or hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, control unit 210 is configured to, based on the sensed data (e.g., image data captured by image capture devices 138 and/or 102, position information from GPS sensors), generate and render for display on display 203 a virtual surface comprising one or more virtual content items (e.g., virtual content items 124, 126 of FIG. 1A) associated with a position contained within field of view 130A, 130B of image capture devices 138. As explained with reference to FIGS. 1A-1B, a virtual content item may be associated with a position within a virtual surface, which may be associated with a physical surface within a real-world environment, and control unit 210 can be configured to render the virtual content item (or portion thereof) for display on display 203 in response to a determination that the position associated with the virtual content (or portion therefore) is within the current field of view 130A, 130B. In some examples, a virtual surface is associated with a position on a planar or other surface (e.g., a wall), and control unit 210 will generate and render the portions of any virtual content items contained within that virtual surface when those portions are within field of view 130A, 130B.

In one example, surface 220 of peripheral device 136 is a presence-sensitive surface, such as a surface that uses capacitive, conductive, resistive, acoustic, or other technology to detect touch and/or hover input. In some examples, surface 220 of peripheral device 136 is a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). In such an example, peripheral device 136 can render a user interface or other virtual elements (e.g., virtual markings) on touchscreen 220 and detect user input (e.g., touch or hover input) on touchscreen 220. In that example, peripheral device 136 can communicate any detected user input to HMD 112 (and/or console 106 of FIG. 1A) using wireless communications links (e.g., Wi-Fi, near-field communication of short-range wireless communication such as Bluetooth), using wired communication links (not shown), or using other types of communication links. In some examples, peripheral device can include one or more input devices (e.g., buttons, trackball, scroll wheel) for interacting with virtual content (e.g., to select a virtual UI element, scroll through virtual UI elements).

FIG. 2B is an illustration depicting another example HMD 112, in accordance with techniques described in this disclosure. As shown in FIG. 2B, HMD 112 may take the form of glasses. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203.

The HMD 112 of FIGS. 2A and 2B implements a graphics pipeline that preforms intra-device processing of surface texture data received from, for example, the peripheral device 136 and/or the console 106. To communicate between components of the HMD 112, the graphics pipeline divides surface textures and other graphics management commands into packets to transmit to a display buffer controlled by a double buffer within the display devices of the HMD 112. This enables a reduction of the amount of the surface texture data that is transmitted to the display device for the video frame updates.

FIG. 3 is a block diagram showing example implementations of console 106, HMD 112, and peripheral device 136 of multi-device artificial reality system 10, 20 of FIGS. 1A, 1B, in accordance with techniques described in this disclosure. In the example of FIG. 3, console 106 performs pose tracking, gesture detection, and user interface and virtual surface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or image capture devices 138 HMD 112 (FIGS. 1A, 2A, 2B) to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, peripheral devices, and the like. Moreover, the one or more I/O interfaces 315 may include one or more wired or wireless network interface controllers (NICs) for communicating with a network, such as network 104.

Software applications 317 of console 106 operate to provide an overall artificial reality application. In this example, software applications 317 include application engine 320, rendering engine 322, and user interface engine 328.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real-world environment, such as motion by user 110 and/or feature tracking information with respect to user 110.

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth. Rendering engine 322 is configured to render, based on a current pose for peripheral device 136, the virtual user interface at a user interface position, in the artificial reality environment, that is locked relative to a position of peripheral device 136 in the artificial reality environment. The user interface position may be a position of one of presence-sensitive surfaces 220, and rendering engine 322 may scale, rotate, and otherwise transform the virtual user interface to apply projection to match the pose, size, and perspective of the presence-sensitive surface 220 such that the virtual user interface appears, in the artificial reality environment, to be overlaid on the presence-sensitive surface 220. User interface engine 328 may generate virtual user interface to be partially transparent, allowing presence-sensitive surface 220 to be seen by the user. This degree of transparency may be configurable.

Console 106 may output this virtual user interface and other artificial reality content, via a communication channel, to HMD 112 for display at HMD 112. Rendering engine 322 receives pose information for peripheral device 136 to continually update the user interface position and pose to match that of the peripheral device 136, such as that of one of presence-sensitive surfaces 220.

In the example shown in FIG. 3, peripheral device 136 includes one or more processors 346 and memory 344 that, in some examples, provide a computer platform for executing an operating system 342, which may be an embedded, real-time multitasking operating system, for instance, or other type of operating system. In turn, operating system 346 provides a multitasking operating environment for executing one or more software components. In some examples, peripheral device 136 includes one or more presence-sensitive surfaces 220 (e.g., one or more surfaces that use capacitive, conductive, resistive, acoustic, and/or other technology to detect touch and/or hover input). In one or more aspects, peripheral device 136 can be configured to detect touch and/or hover input at presence-sensitive surface 220, process that input (e.g., at processors 346) and communicate the touch and/or hover input and communicate information about that input (including location information about that input) to console 106 and/or HMD 112. As discussed with respect to the example of FIG. 2A, presence-sensitive surface(s) 220 can comprise a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). As further shown in FIG. 3, in this example, peripheral device 136 further includes one or more motion sensors 348, such as one or more accelerometers (also referred to as IMUs) that output data indicative of current acceleration of peripheral device 136, GPS sensors that output data indicative of a location or position of peripheral device, radar or sonar that output data indicative of distances of peripheral device 136 from various objects (e.g., from a wall or other surface), or other sensors that provide indications of a location, position, and/or orientation of peripheral device or other objects within a physical environment. In some examples, processors 346 are coupled to presence-sensitive surface(s) 220 and motion sensors 246. In some examples, processors 346 and memory 344 may be separate, discrete components. In other examples, memory 344 may be on-chip memory collocated with processors 346 within a single integrated circuit. In one or more aspects, peripheral device 136 can coexist with the HMD and, in some example, operate as an auxiliary input/output device for the HMD in the virtual environment. In some examples, the peripheral device 136 may operate as an artificial reality co-processing device to which some of the functions of the HMD are offloaded. In one or more aspects, peripheral device 136 can be a smartphone, tablet, or other hand-held device.

In some examples, each of processors 302, 312, 346 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314, 344 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

The HMD 112 of FIG. 3 implements the graphics pipeline that preforms intra-device processing of surface texture data received from, for example, the peripheral device 136 and/or the console 106. To communicate between components of the HMD 112 (e.g., between the application engine 340, the memory 304, and the electronic display 203), the graphics pipeline divides surface textures and other graphics management commands into packets to transmit to a display buffer controlled by a double buffer within the electronic display 203 of the HMD 112. This enables a reduction of the amount of the surface texture data that is transmitted to the display device for the video frame updates.

FIG. 4 is a block diagram depicting example implementations of HMD 112 and peripheral device 136 of the multi-device artificial reality systems of FIGS. 1A and 1B operating in accordance with the techniques described in this disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to provide an overall artificial reality application. In this example, software applications 417 include application engine 440, rendering engine 422, pose tracker 426, and user interface engine 428. In various examples, software components 417 operate similar to the counterpart components of console 106 of FIG. 3 (e.g., application engine 320, rendering engine 322, pose tracker 326, and user interface engine 328) to construct artificial content for display to user 110.

The HMD 112 of FIG. 4 implements the graphics pipeline that preforms intra-device processing of surface texture data received from, for example, the peripheral device 136 and/or the console 106. To communicate between components of the HMD 112 (e.g., between the application engine 340, the memory 304, and the electronic display 203), the graphics pipeline divides surface textures and other graphics management commands into packets to transmit to a display buffer controlled by a double buffer within the electronic display 203 of the HMD 112. This enables a reduction of the amount of the surface texture data that is transmitted to the display device for the video frame updates.

FIG. 5 is a block diagram illustrating an example implementation of a distributed architecture for a multi-device artificial reality system in which one or more devices (e.g., peripheral device 136 and HMD 112) are implemented using one or more SoC integrated circuits within each device. As described, peripheral device 136 and HMD 112 are architected and configured to enable efficient communication of surface data defining the virtual surfaces between the devices in the multi-device artificial reality system.

In general, the SoCs illustrated in FIG. 5 represent a collection of specialized integrated circuits arranged in a distributed architecture, where each SoC integrated circuit includes various specialized functional blocks configured to provide an operating environment for artificial reality applications. FIG. 5 is merely one example arrangement of SoC integrated circuits. The distributed architecture for a multi-device artificial reality system may include any collection and/or arrangement of SoC integrated circuits.

In this example, SoC 530A of HMD 112 (sometimes referred to as the "AR central processing SoC") comprises functional blocks including security processor 224, tracking 570, an encryption/decryption 580, display processors 582, an interface 584, and a direct memory access (DMA) controller 585. Tracking 570 provides a functional block for eye tracking 572 ("eye 572"), hand tracking 574 ("hand 574"), depth tracking 576 ("depth 576"), and/or Simultaneous Localization and Mapping (SLAM) 578 ("SLAM 578"). For example, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 588A-588N (collectively, "image capture devices 588"). Image capture devices may include video cameras, laser scanners, Doppler radar scanners, depth scanners, or the like, configured to output image data representative of the physical environment. More specifically, image capture devices capture image data representative of objects (including peripheral device 136 and/or hand) in the physical environment that are within a field of view of image capture devices, which typically corresponds with the viewing perspective of HMD 112. Based on the sensed data and/or image data, tracking 570 determines, for example, a current pose for the frame of reference of HMD 112 and, in accordance with the current pose, renders the artificial reality content.

Encryption/decryption 580 is a functional block to encrypt outgoing data communicated to peripheral device 136 and decrypt incoming data communicated from peripheral device 136. Encryption/decryption 580 may support symmetric key cryptography to encrypt/decrypt data with a session key (e.g., secret symmetric key). Encryption/decryption 580 facilitates secure communication between, for example, the peripheral device 136 and the head-mounted display 112.

Display processors 582 includes various processors such as a video processing unit, graphics processing unit, digital signal processors, encoders and/or decoders, and/or others.

Interface 584 is a functional block that includes one or more interfaces for connecting to functional blocks of AR central processing SoC 530A. As one example, interface 584 may include peripheral component interconnect express (PCIe) slots. AR central processing SoC 530A may connect with SoCs 530B and 530C using interface 584. AR central processing SoC 530A may connect with a communication device (e.g., radio transmitter) using interface 584 for communicating with other devices, e.g., peripheral device 136. The interface 584 includes video data communication interfaces that each connect to a corresponding interface of the SoCs 530B and 530C. The video data communication interface includes (i) different transmission rates with different clocking speeds (sometimes referred a "low power" for relatively lower clocking speeds and a "high speed" for relatively fast clocking speeds), and (ii) a video mode (e.g., a continuous refresh mode) and a command mode (e.g., an intermittent refresh mode). In some examples, the video data communication interface operates in the high-speed command mode. In the command mode, the video data communication interface can be put into an idle state to save power between transmissions. Generally, the amount of data that can be transmitted in a message while in the command mode is smaller than the amount of data that can be transmitted in a message while in the video mode. In some examples, the video data communication interface implements a Display Serial Interface (DSI) as specified by the Mobile Industry Processor Interface (MIPI) Alliance (sometimes referred to as "MIPI DSI").

The DMA controller 585 transfers data to and from the memory 534 to make the data available to be manipulated by different components (e.g., the display processor(s) 582, the encryption/decryption processors 580, etc.) and to be transferred by the interface 584. In some examples, the DMA controller 585 includes a state machine that, based on content in command and controller registers, transform the data. For example, the DMA controller 585 may pack filler bytes into an encrypted surface texture to prepare the encrypted surface texture for being broken up into packets and transferred by the interface 585.

SoCs 530B and 530C (sometimes referred to as the "display SoCs") each represents display controllers for outputting artificial reality content on respective displays, e.g., displays 586A, 586B (collectively, "displays 586"). In this example, display SoC 530B may include a display controller for display 568A to output artificial reality content for a left eye 587A of a user. For example, display SoC 530B includes a decryption block 592A, a DMA controller 593A, a decoder block 594A, a display buffer 595A, a display controller 596A, and/or a pixel driver 598A for outputting artificial reality content on display 586A. Similarly, display SoC 530C may include a display controller for display 568B to output artificial reality content for a right eye 587B of the user. For example, display SoC 530C includes a decryption block 592B, a DMA controller 593B, a decoder block 594B, a display buffer 595B, a display controller 596B, and/or a pixel driver 598B for generating and outputting artificial reality content on display 586B. Displays 568 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

The DMA controllers 593A and 593B (collectively the "DMA controllers 593") manage the surface texture as it is received in packet form by the video communication interface, reconstructed, decrypted, and placed in the display buffers 595A and 595B.

The display buffers 595A and 595B (collectively "display buffers 595") are memory circuits located on the display SoCs 530B and 530C that contain surface texture data to be rendered by the displays 568. The display buffers 595 are double buffers that include two locations in memory that are set aside for each surface in the AR scene. For each surface, one of the locations in memory is used when rendering the surface texture and the other location in memory can be updated to change the surface texture of the surface to be rendered in the next video frame. Additionally, the display buffers 595 each include a texture pointer for each surface in the AR scene. The texture pointer points to the location in memory containing the surface texture to be displayed for the corresponding surface in the video frame. To switch surface textures of a surface for the next video frame, the double buffer 595 switches the corresponding texture pointed to point to the other dedicated location in memory containing the updated surface texture data for that surface. In some examples, the display buffer 595 (i) receives an updated surface texture for a surface, (ii) stores the updated surface texture in the dedicated location of memory not being pointed to by the corresponding texture pointer, and (iii) in response to a command that indicates that the surface texture update is complete, switches the texture pointer to the dedicated location in memory.

Peripheral device 136 includes SoCs 510A and 510B configured to support an artificial reality application. In this example, SoC 510A (sometimes referred to as the "AR co-processing SoC") comprises functional blocks including security processor 226, tracking 540, an encryption/decryption 550, a display processor 552, and an interface 554. Tracking 540 is a functional block providing eye tracking 542 ("eye 542"), hand tracking 544 ("hand 544"), depth tracking 546 ("depth 546"), and/or Simultaneous Localization and Mapping (SLAM) 548 ("SLAM 548"). For example, peripheral device 136 may receive input from one or more accelerometers (also referred to as inertial measurement units or "IMUs") that output data indicative of current acceleration of peripheral device 136, GPS sensors that output data indicative of a location of peripheral device 136, radar or sonar that output data indicative of distances of peripheral device 136 from various objects, or other sensors that provide indications of a location or orientation of peripheral device 136 or other objects within a physical environment. Peripheral device 136 may in some examples also receive image data from one or more image capture devices, such as video cameras, laser scanners, Doppler radar scanners, depth scanners, or the like, configured to output image data representative of the physical environment. Based on the sensed data and/or image data, tracking block 540 determines, for example, a current pose for the frame of reference of peripheral device 136 and, in accordance with the current pose, renders the artificial reality content to HMD 112.

Encryption/decryption 550 encrypts outgoing data communicated to HMD 112 or security server and decrypts incoming data communicated from HMD 112 or security server. Encryption/decryption 550 may support symmetric key cryptography to encrypt/decrypt data using a session key (e.g., secret symmetric key). Encryption/decryption 550 facilitates secure communication between, for example, the peripheral device 136 and the head-mounted display 112.

Display processor 552 includes one or more processors such as a video processing unit, graphics processing unit, encoders and/or decoders, and/or others, for rendering artificial reality content to HMD 112.

Interface 554 includes one or more interfaces for connecting to functional blocks of AR co-processing SoC 510A. As one example, interface 554 may include peripheral component interconnect express (PCIe) slots. AR co-processing SoC 510A may connect with one or more communication devices (e.g., radio transmitter) using interface 554 for communicating with other devices, e.g., HMD 112. The interface 554 connects the AR co-processing SoC 510A with the SoC 510B. In some examples, the interface 554 includes a video communication interface (e.g., a MIPI DSI interface, etc.) and a separate data communication interface (e.g., a PCIe interface, etc.) to connect with SoC 510B.

SoC 510B (sometimes referred to as the "application SoC") includes co-application processors 560, application processors 562, video communication interface 555B, and data communication interface 556B. In this example, co-application processors 560 includes various processors, such as a vision processing unit (VPU), a graphics processing unit (GPU), and/or central processing unit (CPU). Application processors 562 may include a processing unit for executing one or more artificial reality applications to generate and render, for example, a virtual user interface to a surface of peripheral device 136 and/or to detect gestures performed by a user with respect to peripheral device 136.

FIG. 6 is an example block diagram of an AR central processing SoC 530A sending a message 600 to display SoCs 530B and 530C. In the illustrated example, the DMA controller 585 prepares the message 600 to be transmitted in one or more packets by the communication interface 584. The message 600 includes a header 602 and a body 604. The header 602 contains information that the DMA controllers 593 use to determine how to process the message. The body 604 contains the contents of the message 600 that effect the operation of the display SoCs 530B and 530C. For example, the header 602 may indicate that the message 600 is a VSYNC message and thus the body will contain a field that specifies the address in the display SoC 530B and 530C of the VSYNC timer and a VSYNC timer value. Example types of messages 600 are described in FIGS. 8-15 below. The communication interface 584 transmits the message in one or more packets 606A to 606D (collectively referred to as the "packets 606"). The number of packets depends on the size of the message. For example, the packets 606 may have a payload size limit of 256 kilobytes.

The communication interface 591 of the display SoC 530B and 530C receives and reassembles the packets 606 into message 600. The DMA controller 593 then checks the header 602 to determine the message type and the payload size. The DMA controller 593 then processes the payload 604 in accordance with the message type. For example, the DMA controller 593 may read or write to a particular address in the display buffer 595, load an encrypted surface texture into a graphics pipeline, and/or modify status and control registers.

FIG. 7 illustrates a structure of the packetized message 606 that is generated as part of the communication pipeline of FIG. 6. In the illustrated example of FIG. 7, the packet 606 includes a packet header 700, a payload 702, and a packet footer 704. The packet header 700 includes information to process the packetized message 606, such as information to identify the packet, identify the size of the packet, and/or identify errors within the packet (e.g., data type, size, and/or an error correction code, etc.). The payload 702 includes the portion of the message 600 to be transmitted in the current packet. In some examples, the payload 702 additionally includes commands to process the information in the payload and/or manage memory for the DMA controller 591 of the display SoC 530B and 530C. The packet footer 704 includes information to check the integrity of the payload 702 (e.g., cyclic redundancy check bytes that are a cyclic redundancy check code of the payload 702, etc.).

FIG. 8 illustrates a structure of a texture update packet 800 that is generated to update a surface texture displayed by the display SoCs 530B and 530C. In the illustrated example of FIG. 8, the header 602 of the texture update packet 800 includes a FORMAT field 802 and a SIZE field 804. The payload 604 of the texture update packet 800 includes one or more texture management fields 806, one or more texture characteristics fields 808, and a texture data field 810. The FORMAT field 802 includes a value that signifies that the packet is a TEXTURE UPDATE packet. The SIZE field 804 specifies the size (e.g., in bytes) of the payload. The texture management field(s) 806 includes information to identity the surface texture (e.g., a handle identifier, etc.) to be updated and/or information to facilitate handling the surface texture data in memory. The texture characteristic field(s) 808 contains information used to process the surface texture to be updated (e.g., a channel mask indicating which channels are included the surface data, the number of blocks in the surface data, the MIP-map level of the surface texture, etc.). The texture data field 810 includes the surface texture data to be updated.

FIG. 9 illustrates an example surface setup packet 900. In the illustrated example, the surface setup packet 900 is sent for each surface to be displayed in an AR scene. The header 602 includes a TYPE field 902 that specifies the type of the message (e.g., a surface setup message) and a SIZE field 904 that specifies the size of the payload (e.g., in bytes). The payload 604 includes (a) a one or more texture management fields 906 that information to identity the surface texture (e.g., a handle identifier, etc.) to be updated and/or information to facilitate identifying and handling the surface texture data in memory, (b) a BASE1 field 910 that specifies a base address for register updates for the first buffer (sometime referred to as the "front buffer"), (c) a BASE2 field 912 that specifies a base address for register updates for the second buffer (sometime referred to as the "back buffer"), (d) a LBASE1 field 914 that specifies the location in memory that the surface texture is to be stored in the front buffer in the display buffer 595, (e) a LBASE2 field 916 that specifies the location in memory that the surface texture is to be stored in the back buffer in the display buffer 595, (f) a SURFACE ID field 918 contains a current identifier for the surface when the surface is active (e.g., there may be set up surfaces that are not active because they are not within the view of the HMD 112), (g) a FORMAT field 920 that specifies the format of the pixel data of the surface texture (e.g., RGB 4:4:4, GRB 4:2:0, RGBA 4:4:4:4, GRBA 4:2:0:4, A8, etc.), (h) a WIDTH field 922 that specifies the width in pixels of the surface texture, and (i) a HEIGHT field 924 that specifies the height in pixels of the surface texture.

FIG. 10 illustrates a structure of a DONE packet 1000 signifying that the last packet of a packetized texture surface has been transmitted. In the illustrated example of FIG. 10, the header 602 of the DONE packet 1000 includes a FORMAT field 1102, a SIZE field 1104. The FORMAT field 1002 includes a value that signifies that the packet is a DONE packet. The SIZE field 1004 specifies the size (e.g., in bytes) of the payload. The payload 604 of the DONE packet 1000 includes one or more texture management fields 1006 that information to identity the surface texture (e.g., a handle identifier, etc.) to be updated and/or information to facilitate identifying and handling the surface texture data in memory. In some examples, the DONE packet 1000 includes a one or more channel characteristics fields 1008, that contain the average value for the respective color/alpha values collected across the entire texture.

FIG. 11 illustrates a structure of a frame setup packet 1100 to define a frame of a surface texture. The frame setup packet 1100 is sent when a virtual surface on which a texture is to be rendered is defined (e.g., by an application executing on the application SoC 510B, etc.). In the illustrated example of FIG. 11, the header 602 of the frame setup packet 1100 includes a FORMAT field 1102 and a SIZE field 1104. the payload 604 of the frame setup packet includes one or more texture management fields 1106, a TIME field 1108, an SE3 field 1110, and a one or more texture integrity fields 1112. The FORMAT field 1102 includes a value that signifies that the packet is a frame setup packet. The SIZE field 1104 specifies the size (e.g., in bytes) of the payload. The texture management fields 1106 contain information to identity the surface texture (e.g., a handle identifier, etc.) to be updated and/or information to facilitate handling the surface texture data in memory. The TIME field 1108 is the time associated with the virtual surface. The SE3 field 1110 carries the pose data for the virtual surface. In some examples, the pose data is a position in 3D space plus a rotation defined by a quaternion (e.g., [x y z qr qx qy qz]). The texture integrity fields 1112 specifies information used to verify that later surface updates are intended up update the specific texture at issue.

FIG. 12 illustrates a structure of a write packet 1200 to write to memory or control registers of the display SoC 530B and 530C. In the illustrated example of FIG. 12, the header 602 of the write packet 1200 includes a FORMAT field 1202, a SIZE field 1204, and the payload 604 of the write packet 1200 includes an ADDRESS field 1206, and a DATA field 1208. The FORMAT field 1202 includes a value that signifies that the packet is a write packet. The SIZE field 1204 specifies the size (e.g., in bytes) of the payload. The ADDRESS field 1206 specifies a destination address in the memory of the display SoC 530B and 530C. For example, the ADDRESS field may specify a location in memory that corresponds with a command and control register of the display SoC 530B and 530C. The DATA field 1208 includes the value to be written in the memory location specified by the ADDRESS field 1206.

FIG. 13 illustrates a structure of a VSYNC packet 1300. The VSYNC packet 1300 synchronizes the video frame of the AR central processing SoC 530A with the video frames of the display SoCs 530B and 530C. The AR central processing SoC 530A sends a VSYNC command to each display SoC 530B and 530C periodically at a VSYNC time or integer multiple of a VSYNC time. In some examples, the AR central processing SoC 530A only transmits the VSYNC packet 1300 periodically (e.g., every two video frames, every five video frames, every ten video frames, etc.) to reduce interface power while facilitating syncing the display SoCs 530B and 530C together. Each display SoC 530B and 530C keeps a VSYNC timer are used to initiate new frames. The VSYNC packet 1300 causes a register write command that is mapped to the VSYNC register in the memory. In the illustrated example of FIG. 13, the header 602 of the VSYNC packet 1300 includes a FORMAT field 1302, a SIZE field 1304, and the payload 604 of the VSYNC packet 1300 includes an ADDRESS field 1306, and a DATA field 1308. The FORMAT field 1302 includes a value that signifies that the packet is a VSYNC packet. The SIZE field 1304 specifies the size (e.g., in bytes) of the payload. The ADRESS field 1306 specifies a destination address for the VSYNC packet on the display SoC 530B and 530C. The DATA field 1308 includes the time value of the VSYNC counter of the AR co-processing SoC 510A to which the display SoC 530B and 530C are being synchronized.

FIG. 14 illustrates a structure of a READ packet 1400. The AR central processing SoC 530A uses the READ packet 1400 to read registers of the display SoCs 530B and 530C. In the illustrated example of FIG. 14, the header 602 of the READ packet 1400 includes a FORMAT field 1502, a SIZE field 1504, and the payload 604 of the READ packet 1400 includes an ADRESS field 1406, and a DATA field 1408. The FORMAT field 1402 includes a value that signifies that the packet is a READ packet. The SIZE field 1404 specifies the size (e.g., in bytes) of the payload. The ADRESS field 1406 specifies an address in memory for the register to be read. The DATA field 1408 includes any parameters used to read the register.

FIG. 15 illustrates a structure of a no operation (NOP) packet 1500 that is used to stall the communication between the AR central processing SoC 530A and the display SoCs 530B and 530C. The AR central processing SoC 530A uses the NOP packet 1600 to stall the communication interface. The display SoCs 530B and 530C ignore the NOP packet 1500. In the illustrated example of FIG. 15, the header 602 of the NOP packet 1500 includes a FORMAT field 1502, a SIZE field 1504, and the payload 604 of the NOP packet 1500 includes a DATA field 1506. The FORMAT field 1502 includes a value that signifies that the packet is a NOOP packet. The SIZE field 1504 specifies the size (e.g., in bytes) of the payload. The DATA field 1506 includes dummy data that can be of any length to cause variable stalls on the interface.

FIGS. 16A, 16B, and 16C are block diagrams of a graphics pipeline between the central processing SoC 530A and the display SoC 530B and 530C that incorporates the communication pipeline of FIG. 6. The graphics pipeline takes a surface texture stored in memory (e.g., the memory 534 of FIG. 5 above) for a surface that is to be updated and displayed in a subsequent video frame, breaks the surface texture into packets, transmits the packets to the display SoCs 530B and 530C, reassembles the packets at the display SoCs 530B and 530C, stores the surface texture in the display buffer 595, and switches the corresponding texture pointer to point to that location in the display buffer.

FIG. 16A illustrates a portion of the graphics pipeline executed by the AR central co-processor SoC 530A. A surface texture 1600 to be updated is stored in memory (e.g., the memory 534, etc.) of the AR central co-processor SoC 530A. A display driver (e.g., one of display processors 582 of FIG. 5 above) obtains the surface texture 1600 to be updated in a subsequent video frame and compresses the surface texture 1600 to become a compressed surface texture 1602. The display driver then appends a display header 1604 to the compressed surface texture 1602. The display header 1604 includes metadata to identify the surface, such as a handle identifier (ID) of the surface, that is used by the display buffer 595 to place the surface texture into the correct location in memory. An example of the display header 1604 accompanying the compressed surface texture 1602 is described in FIG. 8 above. Collectively, the compressed surface texture 1602 and the display header 1604 are referred to as display data 1606. The display driver adds a shell of a crypto header 1608 to the display data 1606. The shell of a crypto header 1608 includes the metadata to support encryption of the display data 1606 using symmetric-key cryptography (such as, AES-GCM cryptography). The display data 1606 and the shell of a crypto header 1608 pair are stored in memory.

A DMA controller (e.g., the DMA controller 585. etc.) subsequently retrieves display data 1606 and the shell of a crypto header 1608. One or more cryptographic processors (e.g., one or more of the encryption/decryption processors 582 of FIG. 5 above) encrypts the display data 1606 into encrypted display data 1610 using the symmetric-key cryptography and adds a crypto header 1612 and a crypto footer 1614. The crypto header 1612 and the crypto footer 1614 include information for the display SoCs 530B and 530C to decrypt the encrypted display data 1610.

FIG. 17 illustrates an example of the encrypted display data 1610, the crypto header 1612, and the crypto footer 1614 (collectively referred to as the "encrypted message"). As illustrated in the example of FIG. 17, the crypto header 1612 includes, for example, the configuration of the encryption, the size of the payload 1620, encryption sync data, etc. The encrypted display data 1610 includes N-bytes of encrypted data (e.g., byte B0 to byte BN−1, etc.). The crypto footer 1614 includes information to verify the integrity and authenticity of the encrypted message.

Returning to FIG. 16A, the DMA controller converts the encrypted display data 1610, the crypto header 1612, and the crypto footer 614 into packed pixel data 1616 in preparation for being transmitted using a high-speed mode in the command mode of the video communication interface 618 (part of the interface 584 of FIG. 5 above). In some examples, the converter 616 converts the encrypted message into pixel data and adds filler bytes in preparation for transmitting.

FIG. 16B illustrates a portion of the graphics pipeline executed by the AR central co-processor SoC 530A. The video communication interface 584 breaks the packed pixel data 1616 into packets 606A-606D and transmits those packets 606A-606D in command mode to the display SoCs 530B and 530C. For example, packed pixel data 1616 may be broken into four packets 606A-606D for transmission. The number of packets may be fewer or greater depending on the size of the packed pixel data 1616. For example, a packet may have a payload size limit of 256 Kbytes. The packets conform to the transmission protocol of the command mode of the video communication interface. FIG. 7 illustrates an example of the structure of the packets 606. The packets 606 are received by the video communication interfaces 591 of the display SoCs 530B and 530C to recreate packed pixel data 1616.

FIG. 16C illustrates a portion of the graphics pipeline executed by the display SoCs 530B and 530C. The video communication interface 591 receives the packets. After a DONE command is received from the AR central processing SoC 510A, the DMA controller 593 converts the assembled packets into the encrypted display data 1610, the crypto header 1612, and the crypto footer 1614. For example, the display SoCs 530B and 530C remove, from each of the packets 606, the packet header 700, the packet footer 704, the DSC command field 712 and the filler bytes 714. The decryption block 592 decrypts the encrypted display data 610 to generate the compressed surface texture 1602 and the display header 1604 in plain text. Based on the display header 1604, DMA controller 593 places the compressed surface texture 1602 into the location in memory in the display buffer 595 corresponding to the surface and switches the corresponding texture pointer to that location in memory. Subsequently, on the next video frame, display controller 596 renders the compressed surface texture 1602 for display on display devices 586. In some examples, more processing may take place before the compressed surface texture 1602 is displayed. For example, the compressed surface texture 1602 may be warped or otherwise manipulated based on the relative orientation of the HMD 112 and/or the field of view of the user 110.

Initially, the AR central co-processor SoC 530A sends a surface setup packet (e.g., the surface setup packet 900 of FIG. 9 above) that defines parameters (e.g., handle IDs, dimensions, memory location, etc.) of surface textures that are applied to the virtual surfaces defined by the frame setup packet. The AR central co-processor SoC 530A may also send a frame setup packet (e.g., the frame setup packet 1100 of FIG. 11 above) that defines the pose of the surface (e.g., defined by a quaternion [x, y, z, qr, qx, qy, qz]). Additionally, a surface texture may be moved to a new relative position using the frame setup packet. Thus, the AR central co-processor SoC 530A may independently change (a) the location and orientation of the surface via frame setup packets and (b) the contents of the surface texture via surface texture update packets. For example, a surface may change locations without a change in the surface texture. When a new virtual surface is defined by an application being displayed by the HMD 112, the AR central co-processor SoC 530A may send a frame setup packet and a surface setup packet to the display SoCs 530B and 530C. The frame setup packet includes information regarding the relative location and rotation of the surface texture and the surface setup packet includes the dimensions of the surface texture and double buffer information. An example packet sequence is shown on Table 1 below.

TABLE 1

| Packet | Result |
|---|---|
| Surface 1 Surface Setup Packet | Define the surface texture of surface 1 |
| Surface 1 Frame Setup Packet | Define the pose of surface 1 |
| Repeat {Surface 1 Texture Update} | Update the surface texture data of surface 1 |
| Surface 1 Frame Setup Packet | Redefine pose of surface 1 |

The AR central co-processor SoC 530A sends surface texture update data using a high speed command mode of video communication interface. The display SoCs 530B and 530C store the surface textures in the display buffer 595. The display SoCs 530B and 530C display a video frame at a regular interval (e.g., 60 video frames a second, etc.). Based on input from the AR central co-processor SoC 530A, the display buffer 595 manipulates texture pointers defined for each surface to switch which surface texture is to be displayed in the next video frame. In such a manner, texture pointers associated with static textures remain pointed to the same location in memory and have that surface texture drawn in each video frame, and texture pointers associated with animated textures change between the two locations in memory as the animated surface texture is updated.

At the start of each new frame, the AR central co-processor SoC 530A sends a VSYNC packet (e.g., the VSYNC packet 1300 of FIG. 13 above) to each display SoC 530B and 530C. Each display SoC 530B and 530C uses this VSYNC arrival to adjust its internal VSYNC timer (e.g., via register write, etc.). For each texture to be updated in a subsequent video frame, AR central co-processor SoC 530A sends one or more packets containing the updated surface texture data. The AR central co-processor SoC 530A sends a DONE command after the last update to the surface texture for a video frame. Each display SoC 530B and 530C updates the corresponding texture pointer on the next video frame after a DONE command for surface texture. An example sequence from the perspective of the AR central co-processor SoC 530A updating two surfaces is provided on Table 2 below.

TABLE 2

| Packet | Result |
|---|---|
| VSYNC message | Synchronize VSYNC |
| Surface 1 Setup message | Define the surface texture of surface 1 |
| Surface 2 Setup message | Define the surface texture of surface 2 |
| VSYNC message | Synchronize VSYNC |
| Surface 1 Texture Update (1 of 1) DONE (Surface 1) message | Update surface texture of surface 1 |
| Surface 2 Texture Update (1 of 3) Surface 2 Texture Update (2 of 3) Surface 2 Texture Update (3 of 3) DONE (Surface 2) message | Update surface texture of surface 2 |
| VSYNC message | Synchronize VSYNC |
| Surface 2 Texture Update (1 of 3) Surface 2 Texture Update (2 of 3) | Wait for DONE message for surface 2 |
| Surface 1 Texture Update (1 of 1) DONE (Surface 1) message | Update surface texture of surface 1 |
| Surface 2 Texture Update (3 of 3) DONE (Surface 2) message | Update surface texture of surface 2 |
| VSYNC message | Synchronize VSYNC |

FIG. 18 is a flowchart of an example method to communicate surface texture display data to a display device that includes a double buffer. Initially, the AR central co-processor SoC 530A detects that a surface texture is to be updated (block 1800). For example, the surface texture in the location in memory associated with a particular surface may have changed in response to receiving an updated surface texture from peripheral device 136. The AR central co-processor SoC 530A generates the packed pixels 1616 based on the updated surface texture (e.g., via the graphics pipeline 1600 of FIG. 16A above) (block 1802). The AR central co-processor SoC 530A breaks the packed pixels 1616 into packets 606 (block 1804). The AR central co-processor SoC 530A transmits one of the the packets 606 of the surface texture (block 1806. The AR central co-processor SoC 530A determines whether there are any more packets 606 to transmit for the surface texture (block 1808). When there are more packets 606 (YES at block 1808), the AR central co-processor SoC 530A transmits the next packet 606 (block 1806). Otherwise, when there are not more packets 606 (NO at block 808), the AR central co-processor SoC 530A then transmits a DONE packet (e.g., the DONE packet 1000 of FIG. 10 above) to signify that the last packet 606 for that particular surface texture has been transmitted (block 1810).

Upon receipt of the DONE packet from the AR central co-processor SoC 530A, the display SoCs 530B and 530C reconstruct the surface texture from the packets 606 (e.g., via the graphics pipeline 1600 of FIG. 16C) (block 1812). The display SoCs 530B and 530C place the surface texture in a location in the display buffer 595 designated for the corresponding surface (e.g., as defined by a received texture setup packet 900 of FIG. 9 above) (block 1814). The display SoCs 530B and 530C then switch the corresponding texture pointer to point to the location in the display buffer 595 that is storing the updated surface texture (block 1816). Subsequently, on the next video frame, the display SoCs 530B and 530C renders the updated surface texture for display on the displays 586 (block 1818).

FIG. 19 is a flowchart of an example method to manage dynamic surface textures. Initially, the AR central co-processor SoC 530A sends surface setup packets (e.g., the surface setup packets 900 of FIG. 9 above) for each surface defined to have a surface texture (block 1900). The AR central co-processor SoC 530A sends the frame setup packets (e.g., the frame setup packets 1100 of FIG. 11 above) (block 1902). The texture setup packets and the frame setup packets for a surface can be sent in any order relative to each other. The AR central co-processor SoC 530A detects that a surface texture is to be updated (block 1904). For example, the surface texture in the location in memory associated with a particular surface may have changed in response to receiving an updated surface texture from peripheral device 136. The AR central co-processor SoC 530A then sends surface update packets and DONE packets to provide the updated surface texture to the display SoCs 530B and 530C (e.g., via the graphics pipeline 1600 of FIGS. 16A, 16B, and 16C) (block 1906). While updating the surface textures, the AR central co-processor SoC 530A determined whether a pose of one of the surfaces is to be redefined (block 1908). For example, the AR central co-processor SoC 530A may receive a message from the peripheral device 136 to redefine the pose of a surface. If a surface pose is to be redefined, the AR central co-processor SoC 530A sends a frame setup packet that defined the new pose and then returns to updating the surface textures (block 1910).

FIG. 20 is a flowchart of an example method update and display surface textures. Initially, the AR central co-processor SoC 530A sends a VSYNC packet (e.g., the VSYNC packet 1300 of FIG. 13 above) to the display SoCs 530B and 530C to synchronize the VSYNC timers of the display SoCs 530B and 530C (block 2000). In response, the display SoCs 530B and 530C set their VSYNC timer to the value provided in the VSYNC packet (block 2002).

For each surface to be displayed, the AR central co-processor SoC 530A sends a texture setup packet (e.g., the texture setup packet 900 of FIG. 9 above) (block 2004 and block 2006). The AR central co-processor SoC 530A sends a texture setup packet (block 2004). The AR central co-processor SoC 530A determines whether there is another texture setup packet to send (block 2006). When there is another texture setup packet to send (YES at block 2006), the AR central co-processor SoC 530A sends the next texture setup packet (block 2004). In response, the display SoCs 530B and 530C setup the double buffer 595 for the surface(s) (block 2008).

In the illustrated example, when there is not another texture setup packet to send, (NO at block 2006), the AR central co-processor SoC 530A sends a VSYNC packet (e.g., the VSYNC packet 1300 of FIG. 13 above) to the display SoCs 530B and 530C to synchronize the VSYNC timers of the display SoCs 530B and 530C (block 2010). In response, the display SoCs 530B and 530C set their VSYNC timer to the value provided in the VSYNC packet (block 2012).

The AR central co-processor SoC 530A sends texture update packets (e.g., the texture update packets 800 of FIG. 8 above) for the surface texture that are updated (block 1214). In response, the display SoCs 530B and 530C process the packets and wait for a DONE packet to each updating surface texture (block 2016). The central co-processor SoC 530A sends the corresponding DONE packets (e.g., the DONE packets 1000 of FIG. 10 above) after the all packets of the texture update for a surface texture have been transferred (block 2018). In response to receiving a DONE packet, the display SoCs 530B and 530C update the corresponding surface texture in the display buffer 595 (block 2020). The display SoCs 530B and 530C also update the buffer pointer to the locations of the updated surface textures (block 2022). In the next video frame, the display SoCs 530B and 530C display the surface textures that are pointed to by the buffer pointers (block 2024).

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. An artificial reality system, comprising:
    a first integrated circuit; and
    at least one second integrated circuit communicatively coupled to the first integrated circuit by a communication interface;
    wherein the first integrated circuit comprises at least one processor configured to, in response to determining that surface texture data of a frame to be rendered for display by the second integrated circuit is to be updated:
        generate an encrypted message comprising a cryptographic header, encrypted surface texture data, and a cryptographic footer, wherein to generate the encrypted surface texture data the first integrated circuit is configured to encrypt a display header specifying a location in at least one display buffer and compressed texture data of the surface texture data of the frame;
        generate packed pixel data based on the encrypted message;
        send the surface texture data in one or more update packets to the second integrated circuit using the communication interface, wherein each update packet of the one or more update packets comprises a different portion of the packed pixel data; and
        send a command to the second integrated circuit using the communication interface, the command indicating that the surface texture data of the frame has been updated;
    wherein the second integrated circuit comprises the at least one display buffer and at least one processor configured to:
        in response to the command, set a pointer to the location in the at least one display buffer storing the surface texture data of the frame; and
        render the surface texture data of the frame for display on a display device.

2. The artificial reality system of claim 1, wherein to generate the packed pixel data, the first integrated circuit is configured to insert filler bytes into the encrypted message in preparation for breaking the encrypted message into the one or more update packets.

3. The artificial reality system of claim 1, wherein the at least one display buffer is a double buffer, wherein the surface texture data is associated with a first buffer at a first memory location within the at least one display buffer and a second buffer at a second memory location within the at least one display buffer.

4. The artificial reality system of claim 1, wherein the first integrated circuit is configured to send the surface texture data when the first integrated circuit receives an update to the surface texture data.

5. The artificial reality system of claim 1, the first integrated circuit is configured to send a texture setup packet to the second integrated circuit that defines characteristics of the surface texture data.

6. The artificial reality system of claim 5, wherein the characteristics of the surface texture data include locations in the at least one display buffer that are to store the surface texture data.

7. A method for rendering an artificial reality scene, comprising:
    determining, by a first integrated circuit, whether surface texture data of a frame to be rendered for display is to be updated;
    in response to determining that the surface texture data of the frame is to be updated:
        generating an encrypted message comprising a cryptographic header, encrypted surface texture data, and a cryptographic footer, wherein generating the encrypted surface texture data comprises encrypting a display header specifying a location in at least one display buffer and compressed texture data of the surface texture data of the frame;
        generating packed pixel data based on the encrypted message;
        sending the surface texture data in one or more update packets to a second integrated circuit using a communication interface, wherein each update packet of the one or more update packets comprises a different portion of the packed pixel data; and
        sending a command to the second integrated circuit using the communication interface, the command indicating that the surface texture data of the frame has been updated;
    in response to receipt of the command, setting, by the second integrated circuit, a pointer to the location in the at least one display buffer for storing the surface texture data of the frame; and
    rendering, by the second integrated circuit, the surface texture data of the frame for display on a display device.

8. The method of claim 7, wherein generating the packed pixel data comprises inserting filler bytes into the encrypted message in preparation for breaking the encrypted message into the one or more update packets.

9. The method of claim 7, wherein the at least one display buffer is a double buffer, wherein the surface texture data is associated with a first buffer at a first memory location within the at least one display buffer and a second buffer at a second memory location within the at least one display buffer.

10. A non-transitory, computer-readable medium comprising instructions that, when executed, cause one or more processors of an artificial reality system including a first integrated circuit and a second integrated circuit communicatively coupled by a communication interface to:
    determine, by the first integrated circuit, whether surface texture data of a frame to be rendered for display is to be updated;
    in response to determining that the surface texture data of the frame is to be updated:
        generate an encrypted message comprising a cryptographic header, encrypted surface texture data, and a cryptographic footer, wherein to generate the encrypted surface texture data the instructions cause the first integrated circuit to encrypt a display header specifying a location in at least one display buffer and compressed texture data of the surface texture data of the frame;

generate packed pixel data based on the encrypted message;

send the surface texture data in one or more update packets to the second integrated circuit using the communication interface, wherein each update packet of the one or more update packets comprises a different portion of the packed pixel data; and send a command to the second integrated circuit using the communication interface, the command indicating that the corresponding surface texture data of the frame has been updated;

in response to receipt of the command, set, by the second integrated circuit, a pointer to the location in the at least one display buffer for storing the surface texture data of the frame; and render, by a display driven by the second integrated circuit, the surface texture data of the frame for display on a display device.

11. The computer-readable medium of claim 10, wherein to generate the packed pixel data the instructions cause the first integrated circuit to insert filler bytes into the encrypted message in preparation for breaking the encrypted message into the one or more update packets.

12. The computer-readable medium of claim 10, wherein the at least one display buffer is a double buffer, wherein the surface texture data is associated with a first buffer at a first memory location within the at least one display buffer and a second buffer at a second memory location within the at least one display buffer.

* * * * *